(12) United States Patent
Yoshida

(10) Patent No.: US 6,714,315 B1
(45) Date of Patent: Mar. 30, 2004

(54) COMMUNICATION SYSTEM AND ITS CONTROL METHOD, AND COMPUTER READABLE MEMORY

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,505

(22) Filed: Jun. 3, 1999

(30) Foreign Application Priority Data

Jun. 4, 1998 (JP) .......................................... 10-156427
Jun. 4, 1998 (JP) .......................................... 10-156428
Jun. 4, 1998 (JP) .......................................... 10-156441

(51) Int. Cl.⁷ ......................... H04M 11/00; H04N 1/00; H04N 1/32
(52) U.S. Cl. ..................... 358/1.18; 358/402; 358/468; 379/100.01; 379/100.08; 379/100.15
(58) Field of Search .................. 358/402, 404, 358/440, 442, 468; 379/100.01, 100.08, 100.13, 100.17, 100.15

(56) References Cited

U.S. PATENT DOCUMENTS

| | | | | |
|---|---|---|---|---|
| 5,767,985 A | * | 6/1998 | Yamamoto et al. | 358/402 |
| 5,995,600 A | * | 11/1999 | Sato | 379/100.14 |
| 6,005,677 A | * | 12/1999 | Suzuki | 358/442 |
| 6,055,067 A | * | 4/2000 | Matsuda et al. | 358/468 |
| 6,198,815 B1 | * | 3/2001 | Mishima | 379/335.09 |
| 6,211,972 B1 | * | 4/2001 | Okutomi et al. | 358/402 |

\* cited by examiner

Primary Examiner—Edward Coles
Assistant Examiner—Jason Sherrill
(74) Attorney, Agent, or Firm—Fitzpatrick, Cella, Harper & Scinto

(57) ABSTRACT

To make it possible to perform dial-up connection through a telephone line to the Internet or leased-line connection through a leased line and change communication modes when facsimile communication is executed correspondingly to a connection line used for facsimile communication through the Internet.

27 Claims, 19 Drawing Sheets

COMMUNICATION SYSTEM AND ITS CONTROL METHOD, AND COMPUTER READABLE MEMORY

BACKGROUND OF THE INVENTION

The present invention relates to a communication system capable of performing facsimile communication through an Internet and its control method, and a computer readable memory.

Conventionally, as for the facsimile communication through the Internet, selection of a communication mode (e.g. resolution) for a user has been the same even if either of dial-up connection or leased-line connection is selected.

Moreover, there are the facsimile communication through the Internet according to the communication method using the G4 standard (hereafter referred to as session base) and the facsimile communication through the Internet according to the communication method using E-mail (hereafter referred to as message base). However, these facsimile communications have not been selected in accordance with the connection mode of a call-in-party terminal to the Internet.

Furthermore, though the facsimile system capable of performing facsimile communication through the Internet includes such three types as the facsimile communication using a FAX service provider and the above session-base and message-base facsimile communications, a normally-used communication method has been fixed to any one of them.

However, as for the above conventional examples, when dial-up connection is used, a communication cost is determined in accordance with a communication time because a PSTN (Public Switched Telephone Network) is used between a facsimile transmission line and a service provider and between a service provider and a facsimile receiver. Therefore, they have a problem that, by executing a high-resolution communication, for example, in which the resolution of a communication image is 600 dpi×600 dpi (resolution in main scanning direction×resolution in sub-scanning direction), the communication cost increases.

Moreover, because the connection mode to the Internet and the communication method of each of the above conventional examples have advantages and disadvantages, every condition is not satisfied by using any one of them. Moreover, it has not been possible to perform facsimile communication by considering advantages and disadvantages and thereby changing connection modes and communication methods in accordance with purposes.

SUMMARY OF THE INVENTION

The present invention is made to solve the above problems and its object is to provide a communication system capable of efficiently executing facsimile communication through the Internet and its control method and a computer readable memory.

To attain the above object, a communication system of the present invention has the following configuration. That is;
there is provided a communication system capable of performing facsimile communication through the Internet comprising:
first connection means for performing dial-up connection to the Internet;
second connection means for performing common carrier leased-line connection to the Internet; and
change means for changing communication modes when the facsimile communication is executed in accordance with the connection means used for the facsimile communication.

To attain the above object, a communication-system control method of the present invention has the following configuration. That is;
there is provided a communication system control method capable of performing facsimile communication through the Internet comprising:
the first connection step of performing dial-up connection to the Internet;
the second connection step of performing common carrier leased-line connection to the Internet; and
the change step of changing communication modes when the facsimile communication is executed correspondingly to the connection step used for the facsimile communication.

To attain the above object, a computer readable memory of the present invention has the following configuration. That is:
there is provided a computer readable memory in which program codes for controlling a communication system capable of performing facsimile communication through the Internet are stored comprising:
a program code for the first connection step of performing dial-up connection to the Internet;
a program code for the second connection step of performing leased-line connection to the Internet; and
a program code for the change step of changing communication modes when the facsimile communication is executed correspondingly to the connection step used for the facsimile communication.

To attain the above object, a communication system of the present invention has the following configuration. That is;
there is provided a communication system for performing facsimile communication through the Internet comprising:
decision means for deciding the connection mode of the terminal of a call-in party; and
control means for controlling the facsimile communication with the call-in party in accordance with a decision result by the decision means.

To attain the above object, a communication-system control method of the present invention has the following configuration. That is;
there is provided a communication-system control method for performing facsimile communication through the Internet comprising:
the decision step of deciding the connection mode of the terminal of a call-in party; and
the control step of controlling the facsimile communication with the call-in party in accordance with a decision result by the decision step.

To attain the above object, a computer readable memory of the present invention has the following configuration. That is;
there is provided a computer readable memory in which program codes for controlling a communication system for performing facsimile communication through the Internet are stored is used which includes:
a program code for the decision step of deciding the connection mode of the terminal of a call-in party; and
a program code for the control step of controlling the facsimile communication with the call-in party in accordance with a decision result by the decision step.

To attain the above object, a communication system of the present invention has the following configuration. That is;

there is provided a communication system capable of performing the facsimile communication through the Internet comprising:

management means for managing at least a communication counterpart, information showing whether the communication to the communication counterpart is facsimile communication using only a PSTN or facsimile communication through the Internet, and information showing whether the communication method for the facsimile communication through the Internet if used uses the session base, message base, or FAX service provider; and control means for controlling the communication to the communication counterpart by referring to the communication information managed by the management means.

To attain the above object, a communication-system control method of the present invention has the following configuration. That is;

there is provided a communication-system control method capable of performing facsimile communication through the Internet comprising:

the management step of managing a communication counterpart, information, showing whether the communication to the communication counterpart is facsimile communication using only a PSTN or facsimile communication through the Internet, and information showing whether the communication method for the facsimile communication through the Internet if used uses the session base, message base, or FAX service provider through at least a storage medium; and control step of controlling the communication to the communication counterpart by referring to the communication information managed by the storage medium in the management step.

To attain the above object, a computer readable memory of the present invention has the following configuration. That is;

there is provided a computer readable memory in which program codes for controlling a communication system capable of performing facsimile communication through the Internet are stored is used which includes:

a program code for the management step of managing a communication counterpart, information showing whether the communication to the communication counterpart is facsimile communication using only a PSTN or facsimile communication through the Internet, and information showing whether the communication method for the facsimile communication through the Internet if used uses the session base, message base, or FAX service provider through at least a storage medium; and a program code for the control step of controlling the communication to the communication counterpart by referring to the communication information managed by the storage medium in the management step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described below in detail by referring to the accompanying drawings.

Embodiment 1

Figure 1:
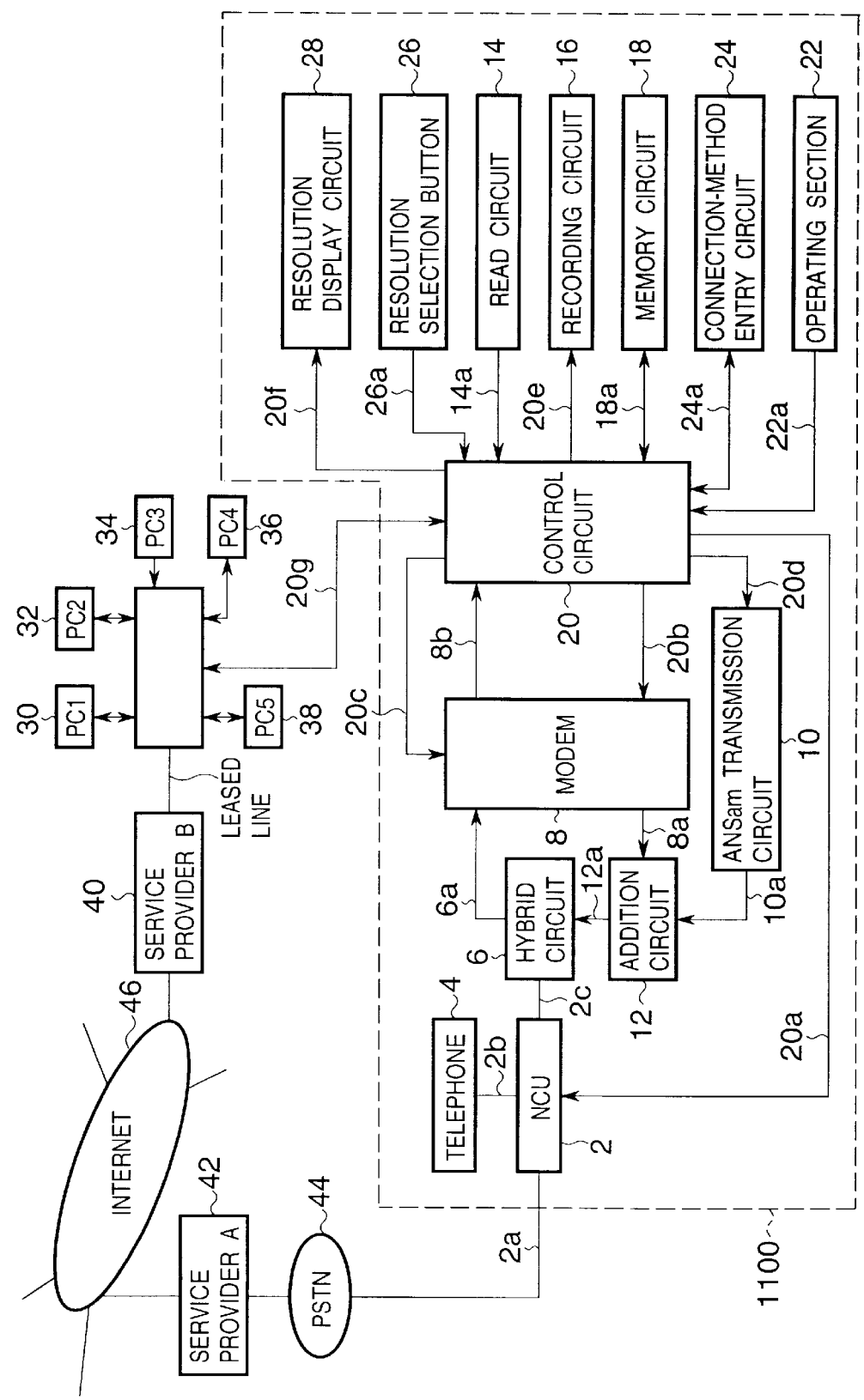
FIG. 1 is a drawing showing a system configuration having the facsimile system of an embodiment 1.
Figure 2:
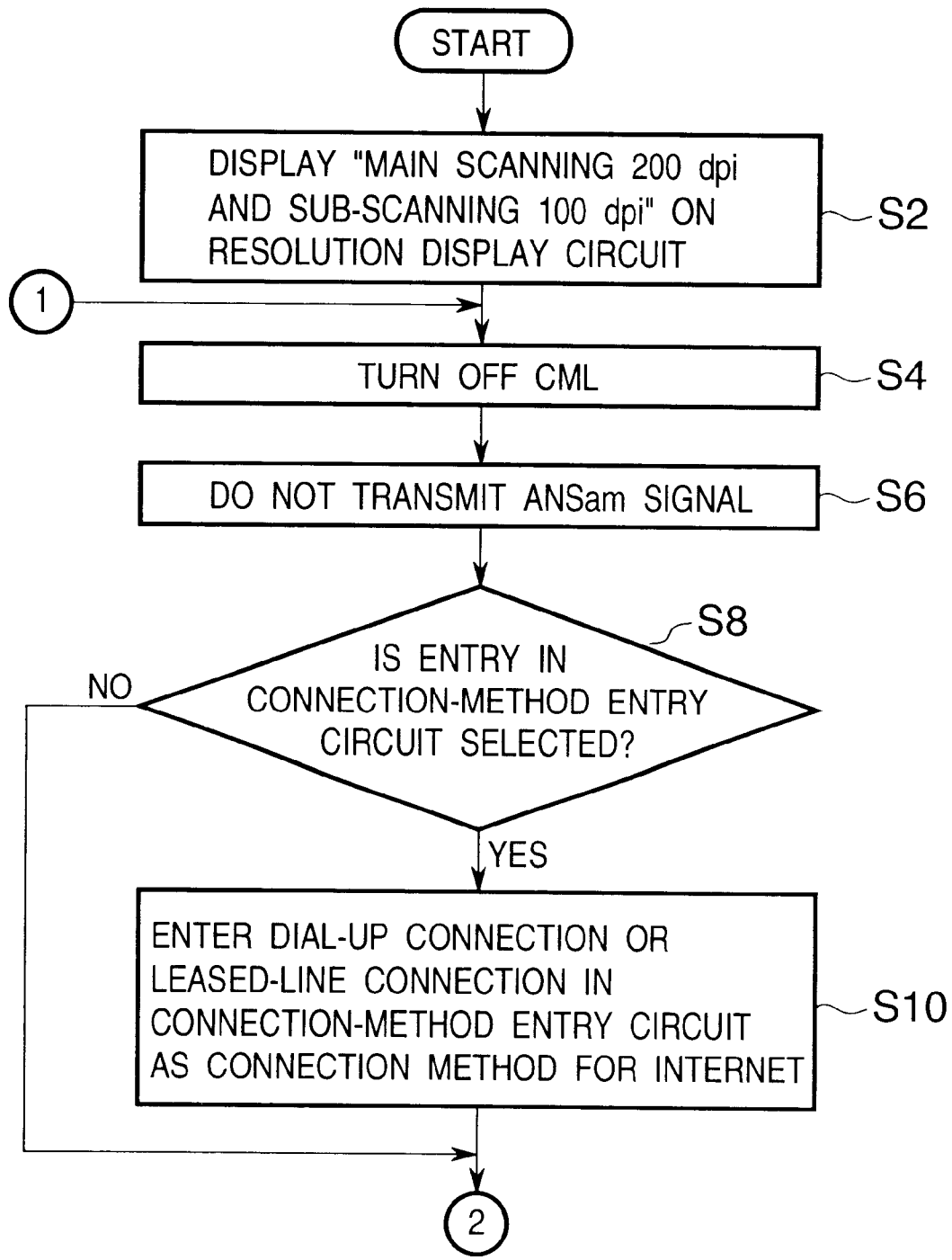
FIG. 2 is a flowchart showing the processings to be executed by the embodiment 1.
Figure 3:
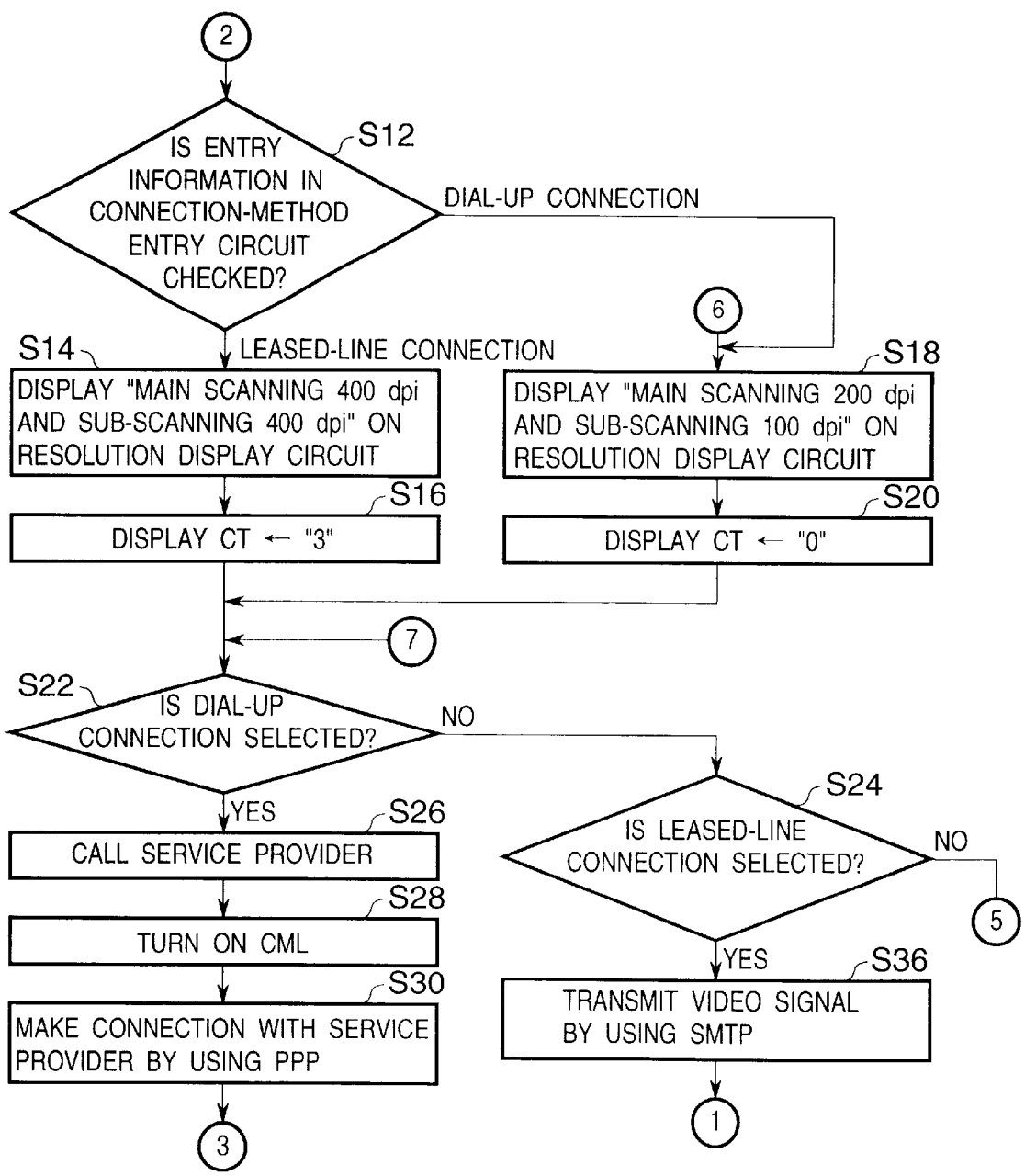
FIG. 3 is a flowchart showing the processings to be executed by the embodiment 1.
Figure 4:
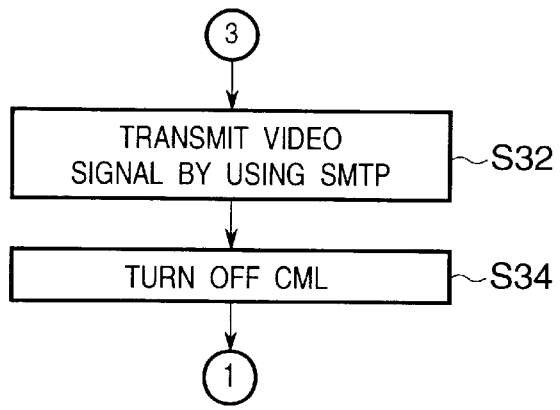
FIG. 4 is a flowchart showing the processings to be executed by the embodiment 1.
Figure 5:
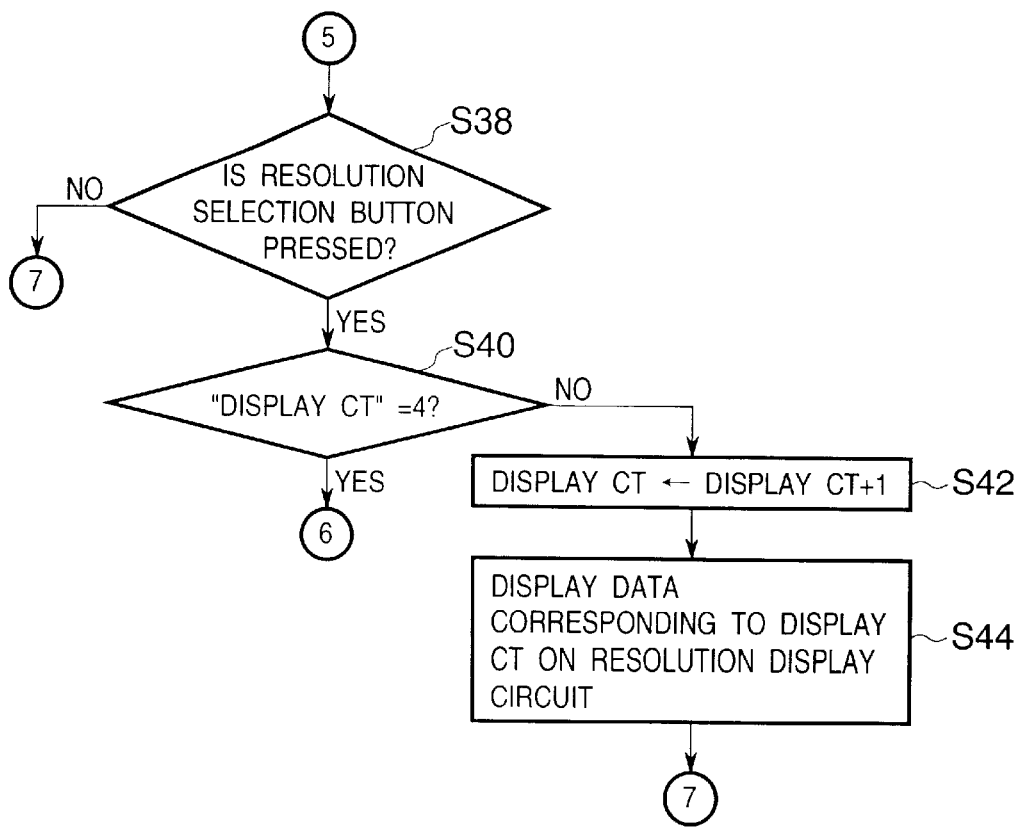
FIG. 5 is a flowchart showing the processings to be executed by the embodiment 1.

FIG. 1 is a drawing showing a system configuration having the facsimile system of the embodiment 1.

In FIG. 1, a facsimile system 100 (FAX_A) is connected with a service provider A 42 through a PSTN (Public Switched Telephone Network) 44. Moreover, the FAX_A 100 is connected with a service provider B 40 and a plurality of personal computers (PC1–PC5) 30, 32, 34, 36, and 38 through a leased line 20g. Furthermore, the service provider A 42 and the service provider B 40 are connected each other through the Internet 46.

Then, the configuration of the FAX_A 100 will be described below in detail.

As for the FAX_A 100, reference numeral 2 denotes an NCU (Network Control Unit) which performs connection control to a terminal to be connected to the PSTN 44 in order to use the PSTN 44 for data communication or the like, switching to a data channel of the PSTN 44, and holding of a loop. Moreover, the NCU 2 connects a telephone line 2a to a telephone 4 when a signal level from a control circuit 20 (signal line 20a) is set to "0," and connects the telephone line 2a to a facsimile system (hybrid circuit 6) when the signal level is set to "1." Under the normal state, the telephone line 2a is connected to the telephone 4.

Reference numeral 6 denotes a hybrid circuit, which separates a signal of a transmission system from a signal of a reception system and transmits a signal output from an addition circuit 12 to the telephone line 2a via the NCU 2. Moreover, the circuit 6 receives a signal from a counterpart via the NCU 2 and outputs the signal to a MODEM 8 via a signal line 6a. Reference numeral 8 denotes a MODEM which modulates and demodulates an input signal in accordance with the ITU-T recommendation V. 8, V. 21, V. 27ter, V. 29, V. 17, or V. 34, in which each transmission mode is designated by a signal line 20c. Moreover, the MODEM 8 inputs a signal from a signal line 20b and outputs modulated data to a signal line 8a. Furthermore, the MODEM 8 inputs a signal from the signal line 6a and outputs demodulated data to a signal line 8b.

Reference numeral 10 denotes an ANSam transmission circuit for transmitting an ANSam signal, which transmits the ANSam signal to a signal line 10a when a signal at a signal level "1" is outputted to a signal line 20d. However, when a signal at a signal level "0" is outputted to the signal line 20d, the ANSam transmission circuit does not output any signal to the signal line 10a. Reference numeral 12 denotes an addition circuit which inputs a signal from the signal line 8a and a signal from 10a and outputs a signal obtained by adding these signals to a signal line 12a.

Reference numeral 14 denotes a read circuit which outputs read data to a signal line 14a. Reference numeral 16 denotes a recording circuit, which successively records signals, sent from a signal line 20e every line. Reference numeral 18 denotes a memory circuit which stores raw information or encoded information of read data, or stores received information or decoded information.

Reference numeral 22 denotes an operating section configured from one-touch dials, abbreviated dials, a ten-key pad, *key, #key, @key, ·key, set key, start key, entry key for entering data in a connection-method entry circuit 24, and other function keys, in which the key information made to correspond to a pressed key is outputted to a signal line 22a.

Reference numeral 24 denotes a connection-method entry circuit for entering a connection method to the Internet, in which dial-up connection or leased-line connection is entered as a method for connection to the Internet through a signal line 24a.

Reference numeral 26 is a resolution selection button, in which pressing pulses are generated in a signal line 26a in accordance with the button pressed frequency. Reference numeral 28 denotes a resolution display circuit which displays a message "main scanning 200 dpi and sub-scanning 100 dpi" as the resolution of a communication image when a signal "0" is outputted to a signal line 20f and subsequently similarly displays a message "main scanning 200 dpi and sub-scanning 200 dpi," "main scanning 200 dpi and sub-scanning 400 dpi, " "main scanning 400 dpi and sub-scanning 400 dpi," or "main scanning 600 dpi and sub-scanning 600 dpi" respectively when a signal "1," "2," "3," or "4" is outputted to the signal line 20f.

Reference numeral 20 denotes a control circuit, which changes transmission modes when facsimile communication through the Internet is executed in accordance with the entry content in the connection-method entry circuit 24. Specifically, the control circuit 20 changes resolutions of defaults for facsimile communication through the Internet according to dial-up connection and facsimile communication through the Internet according to leased-line connection. As for the embodiment 1, the resolution of the default for facsimile communication through the Internet according to dial-up connection is set to "main scanning direction=200 dpi and sub-scanning direction=100 dpi." Moreover, the resolution of the default for facsimile communication through the Internet according to leased-line connection is set to "main scanning direction=400 dpi and sub-scanning direction=400 dpi."

Then, processings to be executed by the embodiment 1 (processings to be executed by the control circuit 20) are described below by referring to FIGS. 2 to 5.

FIGS. 2 to 5 are flowcharts showing the processings to be executed by the embodiment 1.

First, instep S2, a signal "0" is outputted to the signal line 20f to display a message "main scanning 200 dpi and sub-scanning 100 dpi" on the resolution display circuit 28. In step S4, a signal at a signal level "0" is outputted to the signal line 20a to turn off a CML. In step S6, a signal at a signal level "0" is outputted to the signal line 20d so as to prevent an ANSam signal from being transmitted. In step S8, a signal supplied from the signal line 22a is inputted to decide whether entry to the connection-method entry circuit 24 is selected. If the entry is not selected (NO in step S8), step S12 is started. When the entry is selected (YES in step S8), step S10 is started to enter dial-up connection or leased-line connection in the connection-method entry circuit 24 as a method for connection to the Internet 46 through a signal line 24a.

In step S12, a signal supplied from the signal line 24a is inputted to check entry content in the connection-method entry circuit 24. When the entry content shows leased-line connection as the result of checking, step S14 is started to output a signal "3" to the signal line 20f and display a message "main scanning 400 dpi and sub-scanning 400 dpi" on the resolution display-circuit 28. Then, in step S16, "3" is set to a display CT (counter). However, when the entry content shows dial-up connection, step S18 is started to output a signal "0" to the signal line 20f and display a message "main scanning 200 dpi and sub-scanning 100 dpi" on the resolution display circuit 28. Then, in step S20, "0" is set to the display CT (counter).

In this case, the value of the display CT same as the value to be outputted to the signal line 20f is stored.

In step S22, it is decided whether dial-up connection is selected as a method for connection to an Internet 46. When dial-up connection is selected (YES in step S22), step S26 is started to call the service provider A 42 through the PSTN 44 according to dial-up connection. In step S28, a signal at a signal level "1" is outputted to the signal line 20a to turn on the CML. In step S30, connection with the service provider A 42 is performed through the PPP (Point to Point Protocol). In step S32, a video signal is transmitted through the SMTP (Simple Mail Transfer Protocol). The video signal is, for example, MH-encoded into the Tiff file format. In step S34, a signal at a signal level "0" is outputted to the signal line 20a to turn off the CML and step S1 is restarted.

However, when dial-up connection is not selected as a method for connection to the Internet 46 in step S22 (NO in step S22), step S24 is started to decide whether leased-line connection is selected as a method for connection to the Internet 46. When leased-line connection is selected (YES in step S24), step S36 is started to transmit a video signal through the SMTP. The video signal is, for example, MH-encoded into the Tiff file format. However, when leased-line connection is not selected (NO in step S24), step S38 is started.

In step S38, a signal supplied from the signal line 26a is inputted to decide whether the resolution selection button 26 is pressed. When the button 26 is not pressed (NO in step S38), step S22 is restarted. When the button 26 is pressed (YES in step S38), step S40 is started. In step S40, it is decided whether the value of the display CT is set to "4." When the value is set to "4" (YES in step S40), step S18 is restarted. However, when the value is not set to "4" (NO in step S40), step S42 is started to increment the value of the display CT by 1.

In step S44, the value of the display CT is outputted to the signal line 20f, display corresponding to the value is shown by the resolution display circuit 28, and step S22 is restarted. In this case, a message "main scanning 200 dpi and sub-scanning 200 dpi" is displayed for "display CT=1," a message "main scanning 200 dpi and sub-scanning 400 dpi" is displayed for "display CT=2," a message "main scanning 400 dpi and sub-scanning 400 dpi" is displayed for "display CT=3," and a message "main scanning 600 dpi and sub-scanning 600 dpi" is displayed for "display CT=4."

As described above, according to the embodiment 1, facsimile communication through the Internet according to dial-up connection relatively lowers the resolution of a default. Therefore, the facsimile communication having priority in communication cost is realized. However, because facsimile communication through the. Internet according to leased-line connection relatively raises the resolution of a default, the facsimile communication having priority in image quality is realized. Thus, because a method for connection to the Internet can be selected in accordance with the purpose of a user, it is possible to perform facsimile communication through the Internet having higher manipulability.

As for the embodiment 1, a case is described in which a system used is a facsimile system. However, it is needless to say that the present invention can be also applied to a computer having a function for realizing the facsimile system of this embodiment.

Embodiment 2

The embodiment 1 has the configuration for performing facsimile communication at the resolution of a default for facsimile communication through the Internet according to dial-up connection and facsimile communication through the Internet according to leased-line connection respectively. However, it is also possible to use a configuration for performing facsimile communication by making a user select a desired resolution.

Specifically, when facsimile communication through the Internet according to dial-up connection is selected, for example, a user is made to select any one of the following messages "main scanning and sub-scanning": "200 dpi and 100 dpi," "200 dpi and 200 dpi," "200 dpi and 400 dpi," and "400 dpi and 400 dpi" as a resolution. Moreover, when facsimile communication through the Internet according to leased-line connection is selected, for example, it is also possible to make a user select any one of the following messages "main scanning and sub-scanning" as a resolution: "200 dpi and 200 dpi," "200 dpi and 400 dpi," "400 dpi and "400 dpi," and 600 dpi and 600 dpi."

Processings to be executed in the above case are described below by referring to FIG. 6.

The processings to be described below are almost the same as those described for the embodiment 1. Therefore, only different processings will be described below.

Figure 6:
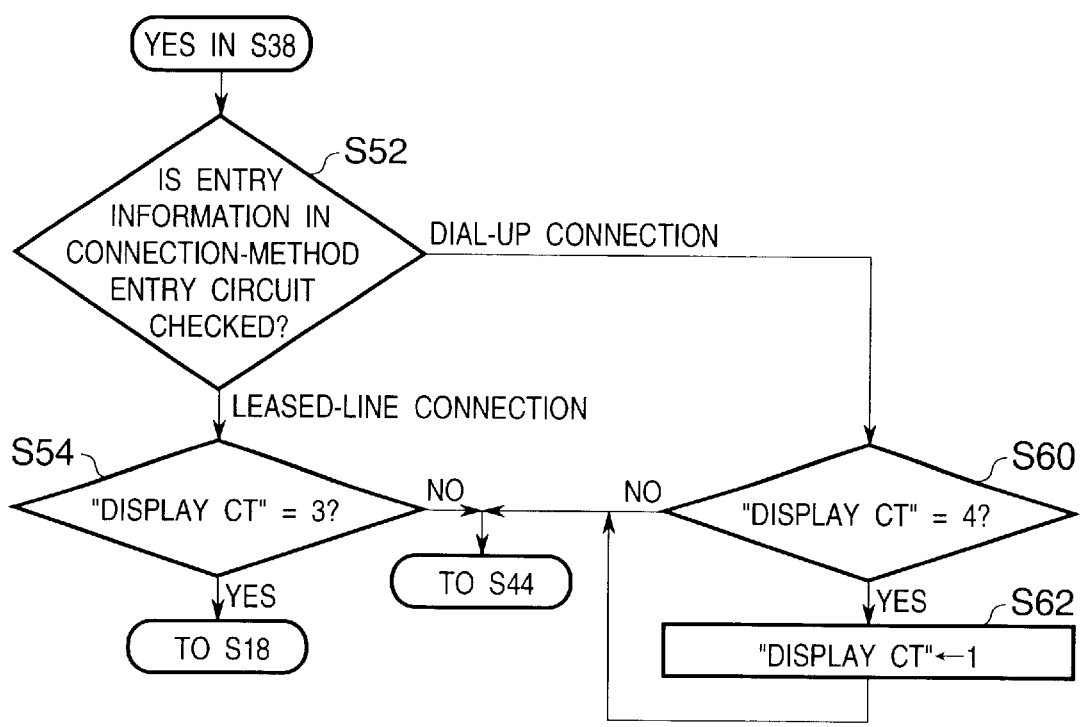
FIG. 6 is a flowchart showing the processings to be executed by an embodiment 2.

FIG. 6 is a flowchart showing the processings to be executed by the embodiment 2 of the present invention.

In step S52, the entry content in the connection-method entry circuit 24 is checked through the signal line 24a. When the entry content shows dial-up connection, step S54 is started to decide whether the value of the display CT is set to "3." When the value is set to "3" (YES in step S54), step S18 is restarted. However, when the value is not set to "3" (NO in step S54), the step S44 is restarted.

However, when the entry content shows leased-line connection in step S52, step S60 is started to decide whether the value of the display CT is set to "4." When the value is not set to "4" (NO in step S60), step S44 is restarted. However, when the value is set to "4" (YES in step S60), step S62 is started to set "1" to the display CT and step S44 is restarted.

As described above, the embodiment 2 makes it possible to select any one of the following messages "main scanning direction x sub-scanning direction" as a resolution for facsimile communication through the Internet according to dial-up connection: "200 dpi×100 dpi," "200 dpi×200 dpi," "200 dpi×400 dpi," and "400 dpi×400 dpi." Moreover, it is possible to select any one of the following messages showing "main scanning direction x sub-scanning direction" as a resolution for facsimile communication through the Internet according to leased-line connection: "200 dpi×200 dpi," "200 dpi×400 dpi," "400 dpi×400 dpi," and "600 dpi×600 dpi." That is, facsimile communication through the Internet according to dial-up connection makes it possible to relatively lower a resolution selection range and perform the facsimile communication having priority in communication cost. Moreover, facsimile communication through the Internet according to leased-line connection makes it possible to relatively raise a resolution selection range and perform the facsimile communication having priority in image quality.

Embodiment 3

Figure 7:
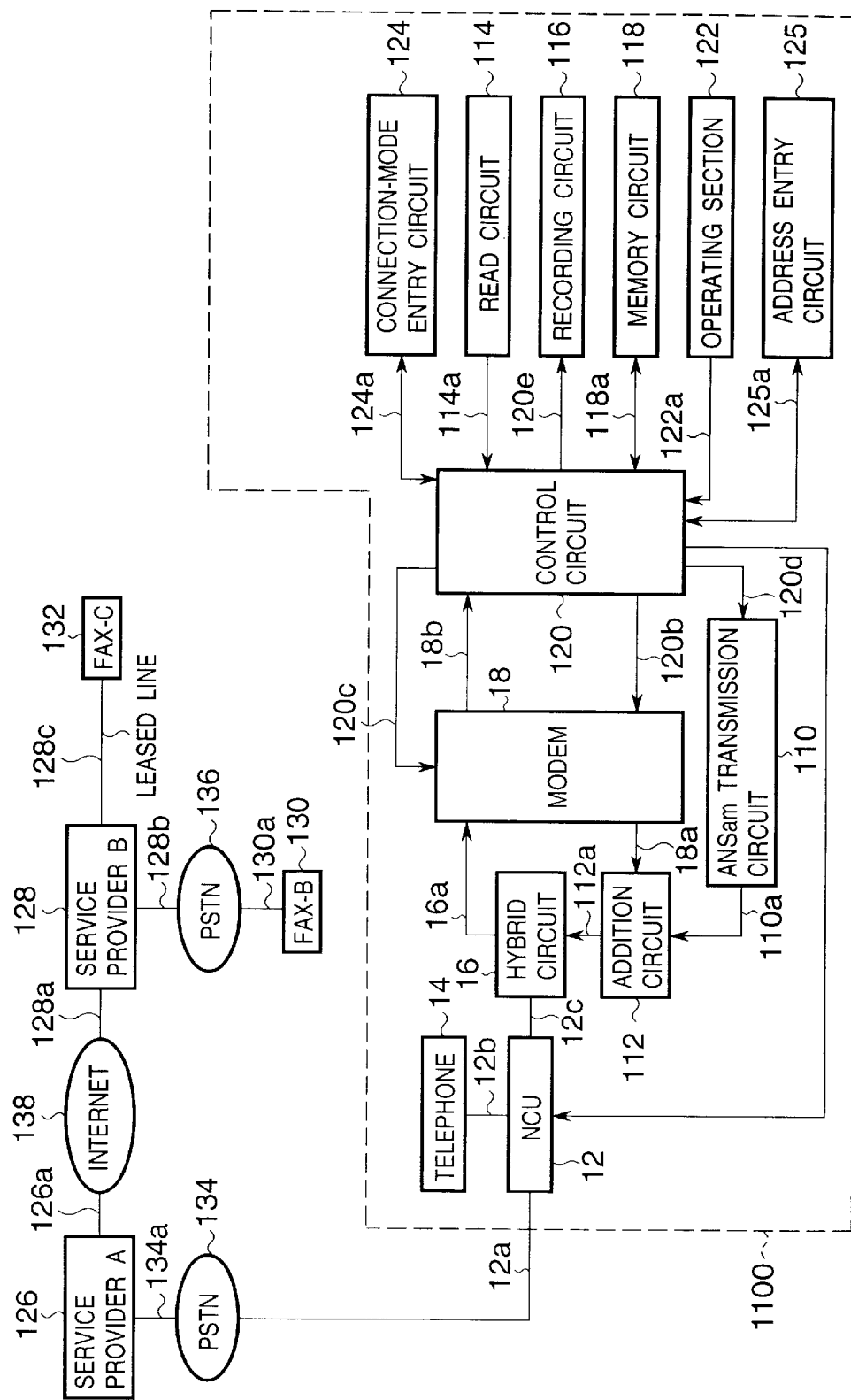
FIG. 7 is a drawing showing a system configuration having the facsimile system of an embodiment 3.

FIG. 7 is a drawing showing the system configuration of the facsimile system of the embodiment 3.

In FIG. 7, a facsimile system 1100 (FAX_A) is connected with the service provider A 126 through a PSTN (Public Switched Telephone Network) 134. A facsimile system 130 (FAX_B) is connected with a service provider B 128 through a PSTN 136. A facsimile system 132 (FAX_C) is connected with the service provider B 128 through a leased line 128c. Moreover, the FAX_A 1100, FAX_B 130 and FAX_C 132 can be facsimile-communicated each other through the Internet 138.

The service provider A 126 and the service provider B 128 are connected each other through the Internet 138. Reference numerals 12a, 134a, 128b, and 130a denote telephone lines. Reference numerals 126a and 128a are leased lines (computer network lines).

Then, the configuration of the FAX_A 1100 will be described below in detail.

The FAX_B 130 and FAX_C 132 respectively have at least a configuration same as that of the FAX_A 1100.

As for the FAX_A 1100, reference numeral 12 denotes an NCU (Network Control Unit) which performs connection control to a terminal to be connected to the PSTN 134 in order to use the PSTN 134 for data communication or the like, switching to a data channel of the PSTN 134, and holding of a loop. Moreover, the NCU 12 connects the telephone line 12a to a telephone 14 when a signal level (signal line 120a) supplied from a control circuit 120 is set to "0," and connects the telephone line 12a to a facsimile system (hybrid circuit 16) when the signal level is set to "1." Moreover, the telephone line 12a is connected to the telephone 14 under the normal state.

Reference numeral 16 denotes a hybrid circuit, which separates a transmission-system signal from a reception-system signal and transmits a signal supplied from an addition circuit 112 to the telephone line 12a via the NCU 12. Moreover, the hybrid circuit 16 receives a signal from the counterpart via the NCU 12 and outputs the signal to a MODEM 18 via a signal line 16a. Reference numeral 18 denotes a MODEM which modulates or demodulates an input signal in accordance with the ITU-T recommendation V. 8, V. 21, V. 27ter, V. 29, V. 17, or V. 34, in which each transmission mode is designated by a signal line 120c. Moreover, the MODEM 18 inputs a signal from a signal line 120b and outputs modulated data to a signal line 18a. Moreover, the MODEM 18 inputs a signal from the signal line 16a and outputs demodulated data to a signal line 18b.

Reference numeral 110 denotes an ANSam transmission circuit for transmitting an ANSam signal. When a signal at a signal level "1" is outputted to a signal line 120d, the ANSam transmission circuit transmits an ANSam signal to a signal line 110a. However, when a signal at a signal level "0" is outputted to the signal line 120d, the transmission circuit does not output any signal to the signal line 110a. Reference numeral 112 denotes an addition circuit which inputs a signal supplied from the signal line 18a and a signal supplied from the signal line 110a and outputs a signal obtained by adding the above signals to a signal line 112a.

Reference numeral 114 denotes a read circuit which outputs read data to a signal line 114a. Reference numeral 116 denotes a recording circuit, which successively records signals, supplied from a signal line 120e every line. Reference numeral 118 denotes a memory circuit which stores raw information or encoded information of read data, or stores received information or decoded information.

Reference numeral 122 denotes an operating section which is configured from one-touch dials, abbreviated dials, a ten-key pad, * key, # key, @ key, · key, set key, start key, connection-mode entry circuit 124, entry key for entering data in an address entry circuit 125, and other function keys, in which the key information made to correspond to a pressed key is outputted to a signal line 122a.

Reference numeral 124 denotes a connection-mode entry circuit for entering the connection mode of a call-in-party terminal, in which an IP address of the call-in-party terminal (when executing communication through the Internet) or a telephone number (when executing communication through only a PSTN without using the Internet) are entered correspondingly to an one-touch dial through a signal line 124a. Moreover, to enter an IP address, it is further entered whether a call-in-party terminal uses dial-up connection or leased-line connection.

Reference numeral 125 denotes an address entry circuit for entering the address of a service provider (in this case, service provider A) used by the FAX_A 1100, in which an address is entered through a signal line 125a.

Reference numeral 120 denotes a control circuit, which changes communication methods for facsimile communication through the Internet depending on whether a call-in-party terminal uses dial-up connection or leased-line connection. Specifically, when the call-in-party terminal uses dial-up connection, facsimile communication through the Internet is executed in accordance with the message base. However, when the call-in-party terminal uses leased-line connection, facsimile communication through the Internet is executed in accordance with the session base. In this case, the connection method of the call-in-party terminal does not relate to that of the call-out-party terminal.

Then, processings to be executed by the embodiment 3 (that is, processings to be executed by the control circuit 120) will be described below by referring to FIGS. 8, 9, and 10.

Figure 8:
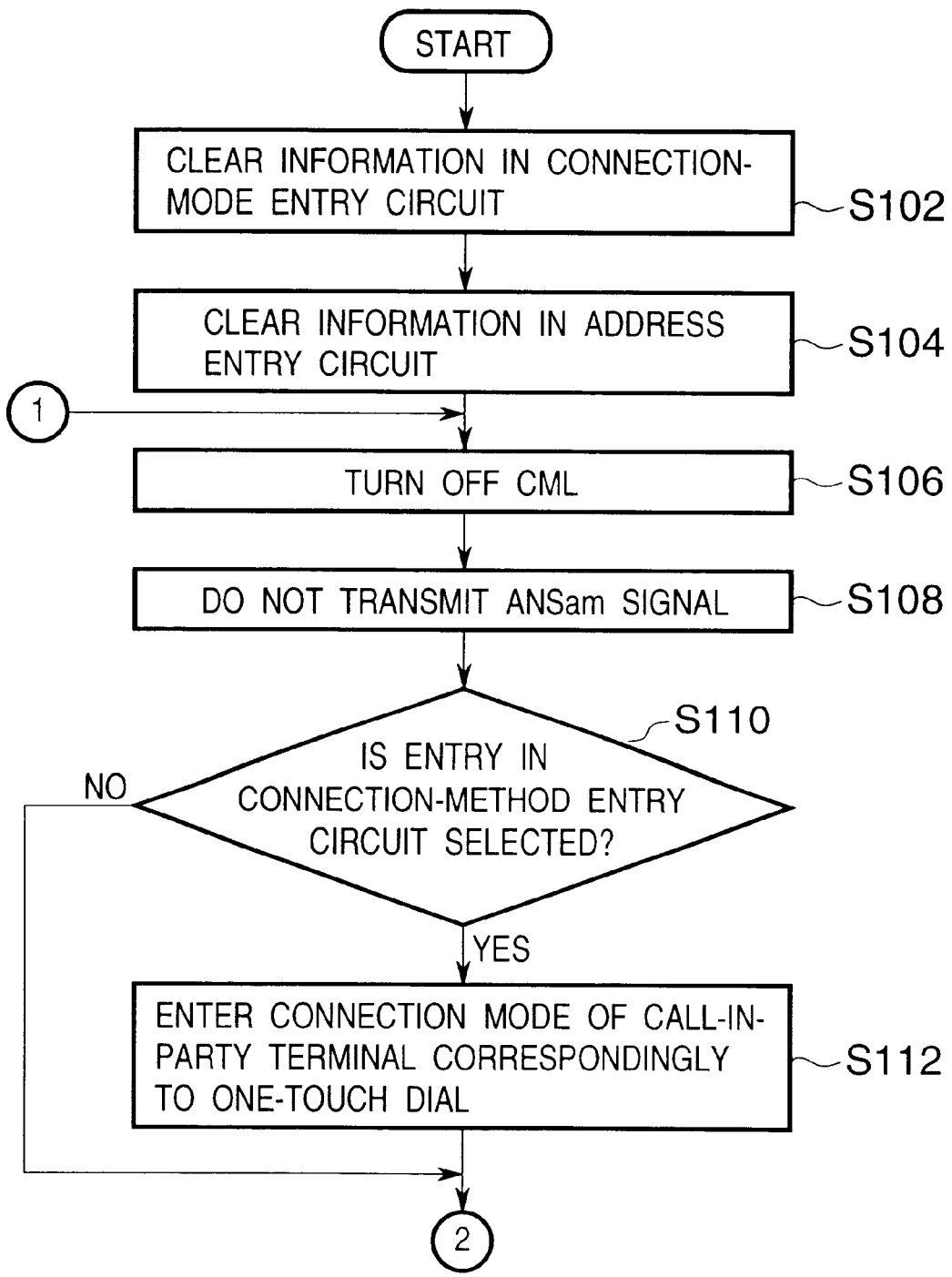
FIG. 8 is a flowchart showing the processings to be executed by the embodiment 3.
Figure 9:
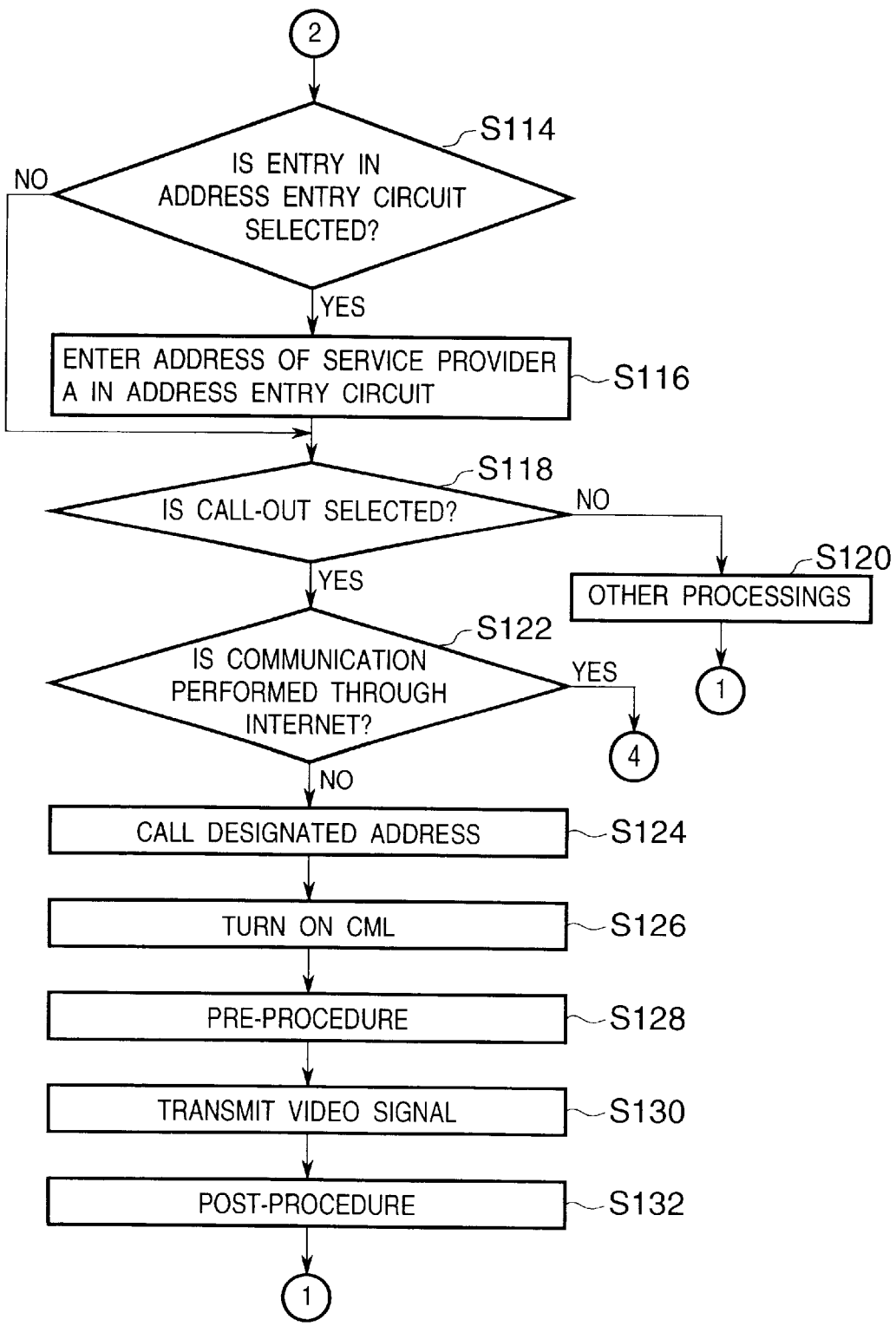
FIG. 9 is a flowchart showing the processings to be executed by the embodiment 3.
Figure 10:
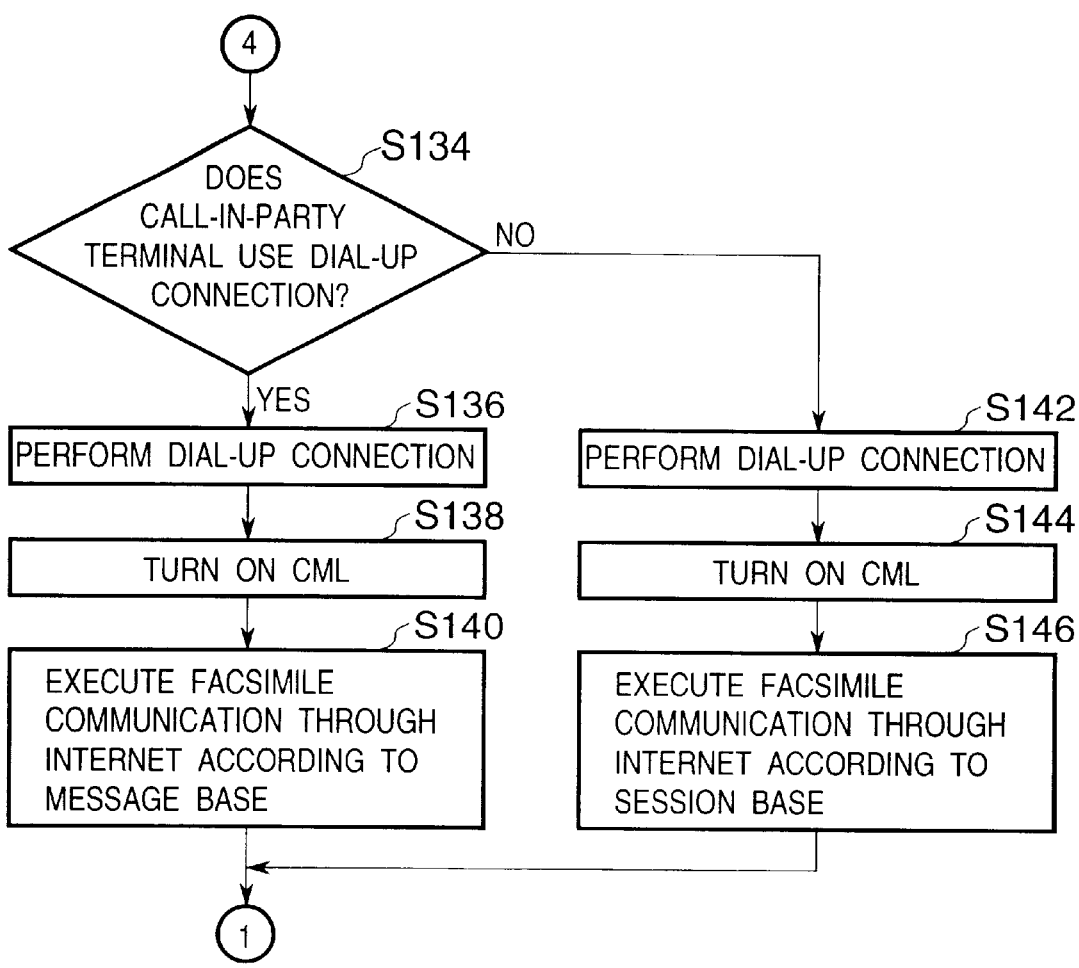
FIG. 10 is a flowchart showing the processings to be executed by the embodiment 3.

FIGS. 8 to 10 are flowcharts showing the processings to be executed by the embodiment 3.

The call-out-party terminal in this flowchart uses the FAX-A 1100 and the call-in-party terminal in this flowchart uses the FAX_B 130 or FAX_C 132.

In step S102, the information in the connection-mode entry circuit 124 is cleared through the signal line 124a. In step S104, the information in the address entry circuit 125 is cleared through the signal line 125a. In step S106, a signal at a signal level "0" is outputted to the signal line 120a to turnoff a CML. In step S108, a signal at a signal level "0" is outputted to the signal line 120d to prevent an ANSam signal from being transmitted.

In step S110, a signal supplied from the signal line 122a is inputted to decide whether entry in the connection-mode entry circuit 124 is selected. When the entry is selected (YES in step S110), step S112 is started to enter the connection mode of a call-in-party terminal to be entered in the connection-mode entry circuit 124 through the signal line 124a. For example, IP address 01 and leased-line connection are entered in a one-touch dial 01 and IP address 02 and dial-up connection are entered in a one-touch dial 02. However, when the entry is not selected (NO in step S110), step S114 is started.

In step S114, it is decided whether entry in the address entry circuit 125 is selected. When the entry is selected (YES in step S114), step S116 is started to enter the address of a service provider to be entered in the address entry circuit 125 through the signal line 125a. In this case, the address of the service provider A is entered. However, when the entry is not selected (NO in step S114), step S118 is started.

In step S118, a signal supplied from the signal line 122a is inputted to decide whether call-out is selected. When call-out is not selected (NO in step S118), step S120 is started to execute other processings. However, when call-out is selected (YES in step S118), step S122 is started.

In step S122, it is decided whether communication is performed through the Internet. Specifically, a signal supplied from the signal line 124a is inputted to make decision in accordance with whether the address entered correspondingly to a one-touch dial is an IP address or a telephone number. When the communication is performed through the Internet (YES instep S122), step S134 is started. However, when the communication is not performed through the Internet (NO in step S122), that is, when the communication is performed through a PSTN, step S124 is started to call a designated address entered in the connection-mode entry circuit 124 using the PSTN. Instep S126, a signal at a signal level "1" is outputted to the signal line 120a to turn on the CML. In step S128, pre-procedure is executed. In step S130, a video signal is transmitted. In step S132, post-procedure is executed.

Moreover, when it is decided in step S122 that the communication is performed through the Internet, a signal supplied from the signal line 124a is inputted in step S134 to decide whether the connection of the call-in-party terminal of an address to be communicated to the Internet uses dial-up connection. When the connection to the Internet uses dial-up connection (YES in step S134), specifically when the one-touch dial 02 is pressed, step S136 is started to input a signal from the signal line 125a and dial-up-connect the signal to the service provider A. In step S138, a signal at a signal level "1" is outputted to the signal line 120a to turn on the CML. In step S140, facsimile communication through the Internet according the message base is executed.

However, when the connection to the Internet uses leased-line connection (NO in step S134), specifically, when the one-touch dial 01 is pressed, step S142 is started to input a signal from the signal line 25a and dial-up-connect the signal to the service provider B. In step S144, a signal at a signal level "1" is outputted to the signal line 120a to turn on the CML. In step S146, facsimile communication through the Internet according the session base is executed.

As for the embodiment 3, a case is described in which the connection of the call-out-party terminal to the Internet uses dial-up connection. However, it is needless to say that the present invention can be applied to a case in which the call-out-party terminal is connected to the Internet in accordance with the leased-line connection.

Moreover, a case is described in which the call-out-party terminal and call-in-party terminal respectively use a facsimile system. However, it is also possible to use a computer having a function for realizing the facsimile system of the embodiment 3 for the call-out-party and call-in-party terminals. Furthermore, the present invention can be applied to an environment in which the above computer and the facsimile system of this embodiment are used together.

As described above, according to the embodiment 3, facsimile communication through the Internet according to the session base realizing capacity confirmation with the counterpart unit cannot be performed when a call-in-party terminal is dial-up-connected and thereby, it is possible to securely execute facsimile communication through the Internet according to the message base in the primitive mode. Moreover, when the call-in-party terminal is leased-line-connected, facsimile communication through the Internet according to the session base realizing capacity confirmation with the counterpart unit can be executed and thereby, it is possible to perform communication using an optimum function.

Embodiment 4

Figure 11:
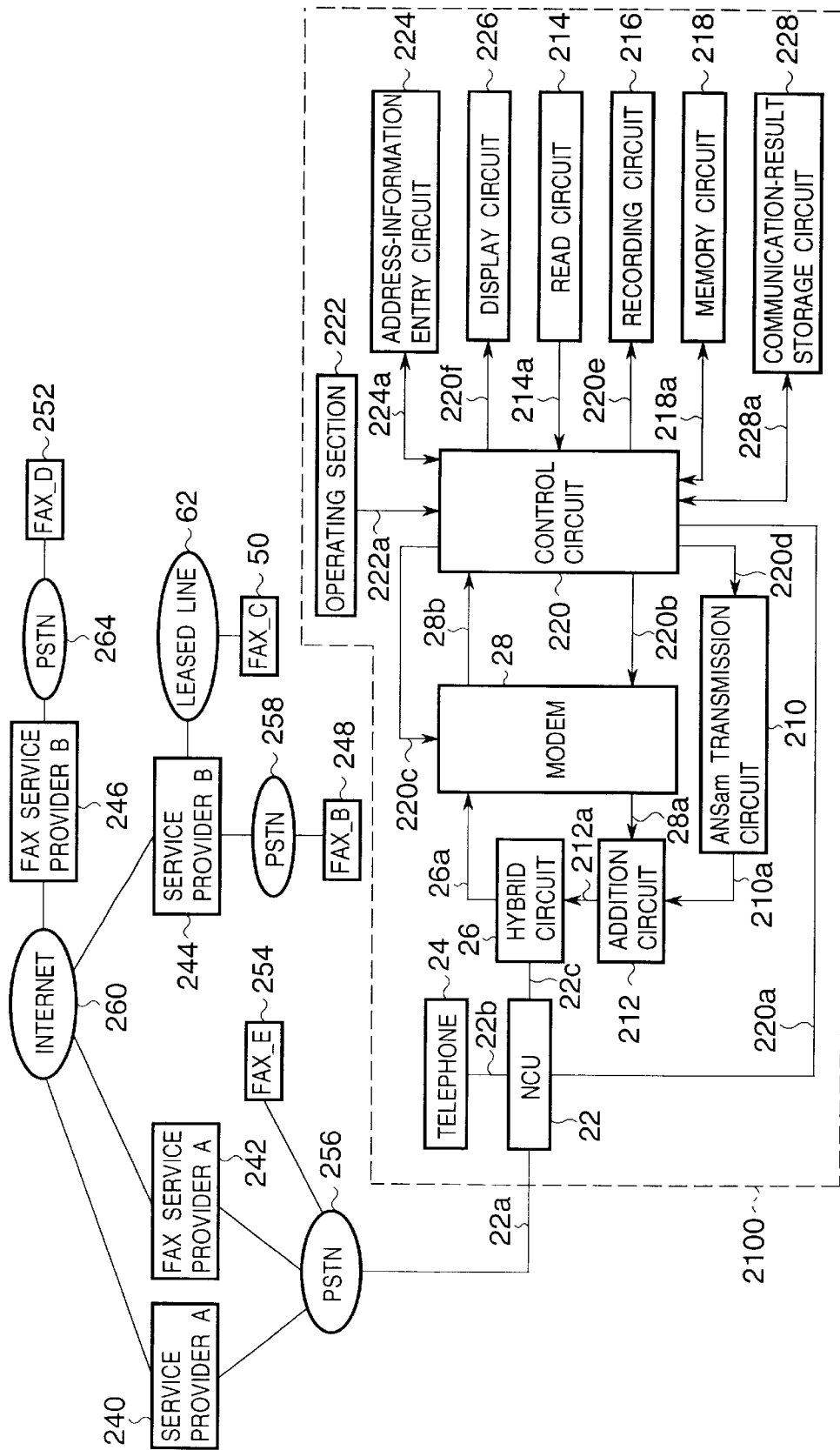
FIG. 11 is a drawing showing a system configuration having the facsimile system of an embodiment 4 of the present invention.
Figure 12:
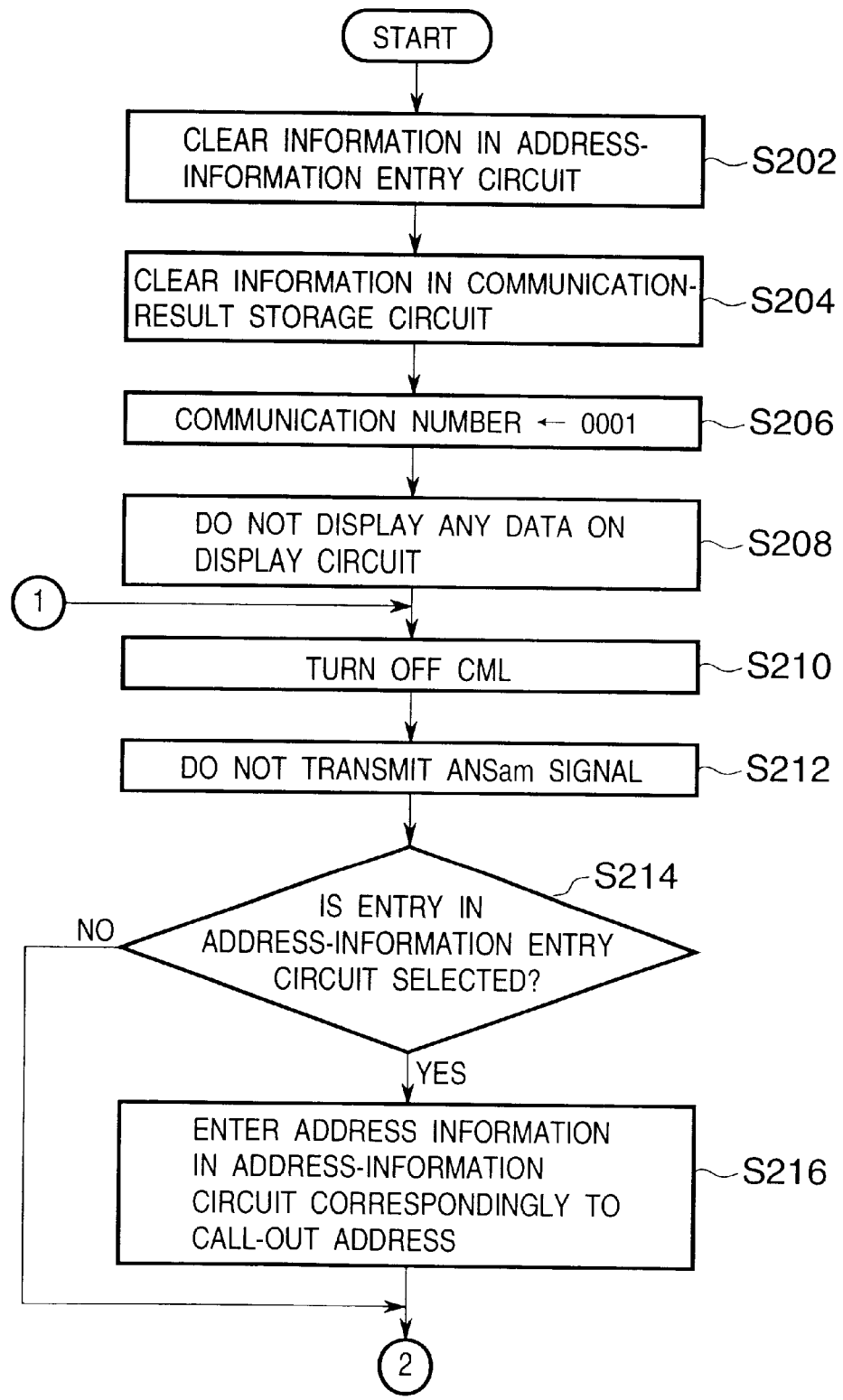
FIG. 12 is a flowchart showing the processings to be executed by the embodiment 4 of the present invention.
Figure 13:
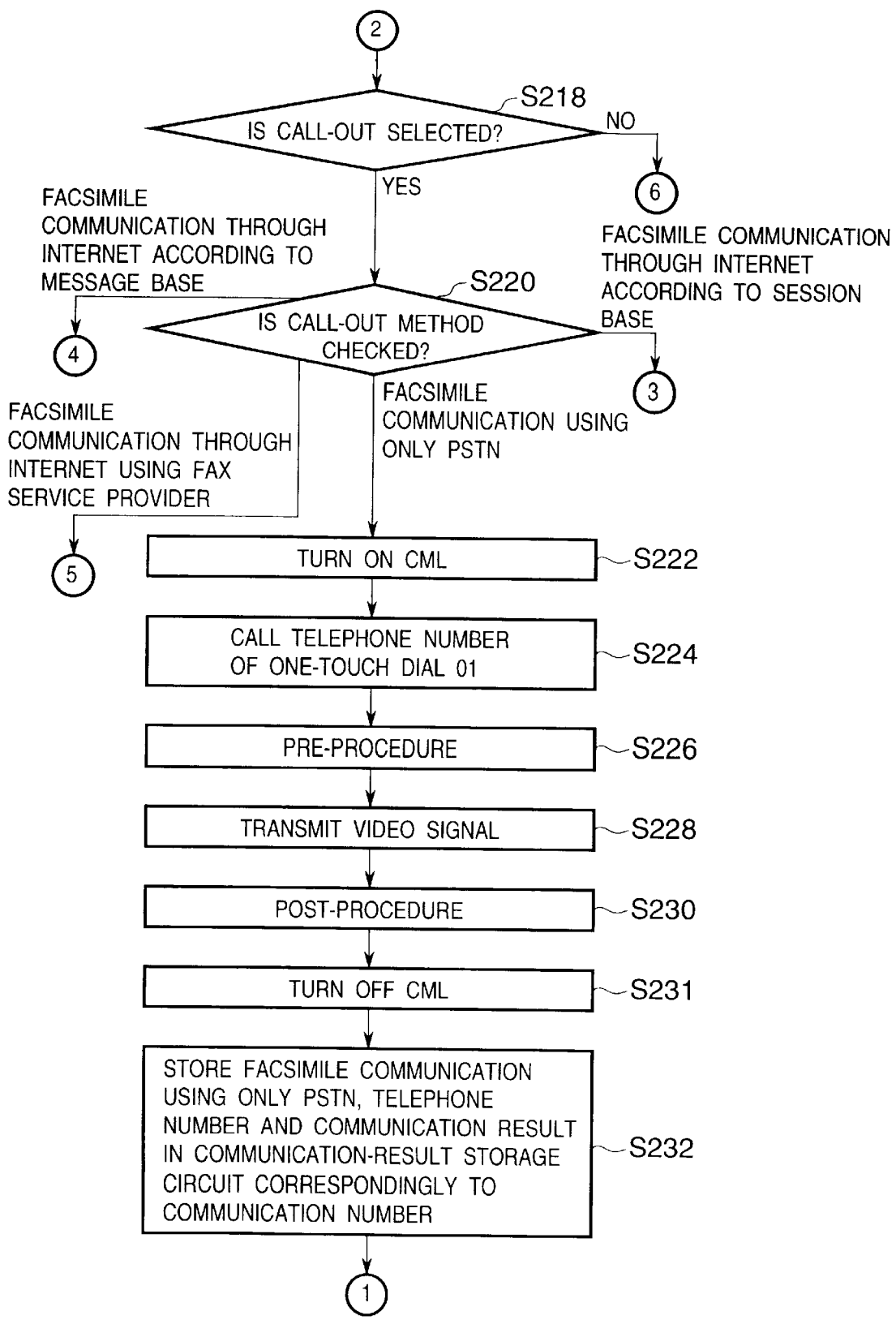
FIG. 13 is a flowchart showing the processings to be executed by the embodiment 4 of the present invention.
Figure 14:
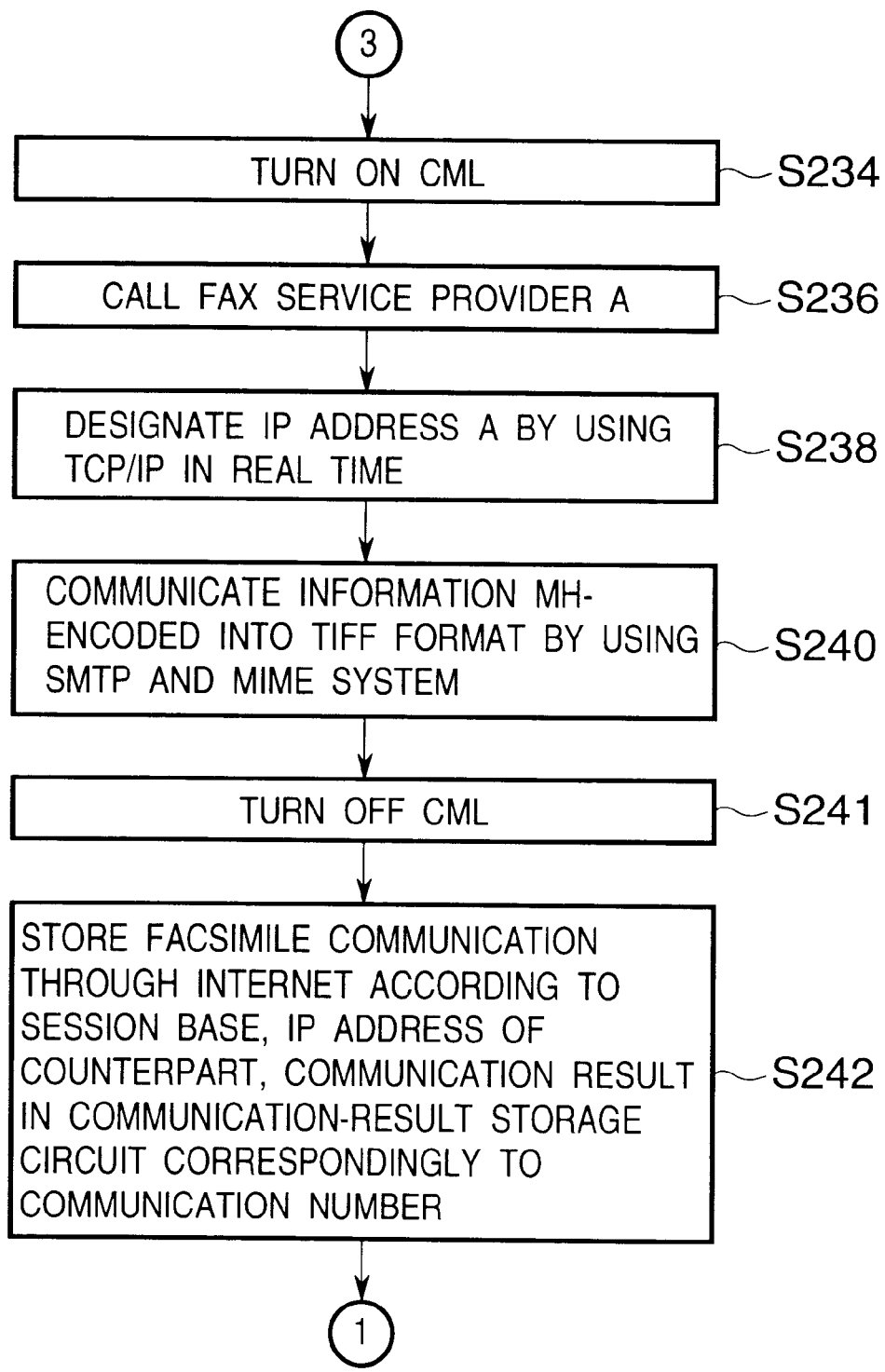
FIG. 14 is a flowchart showing the processings to be executed by the embodiment 4 of the present invention.
Figure 15:
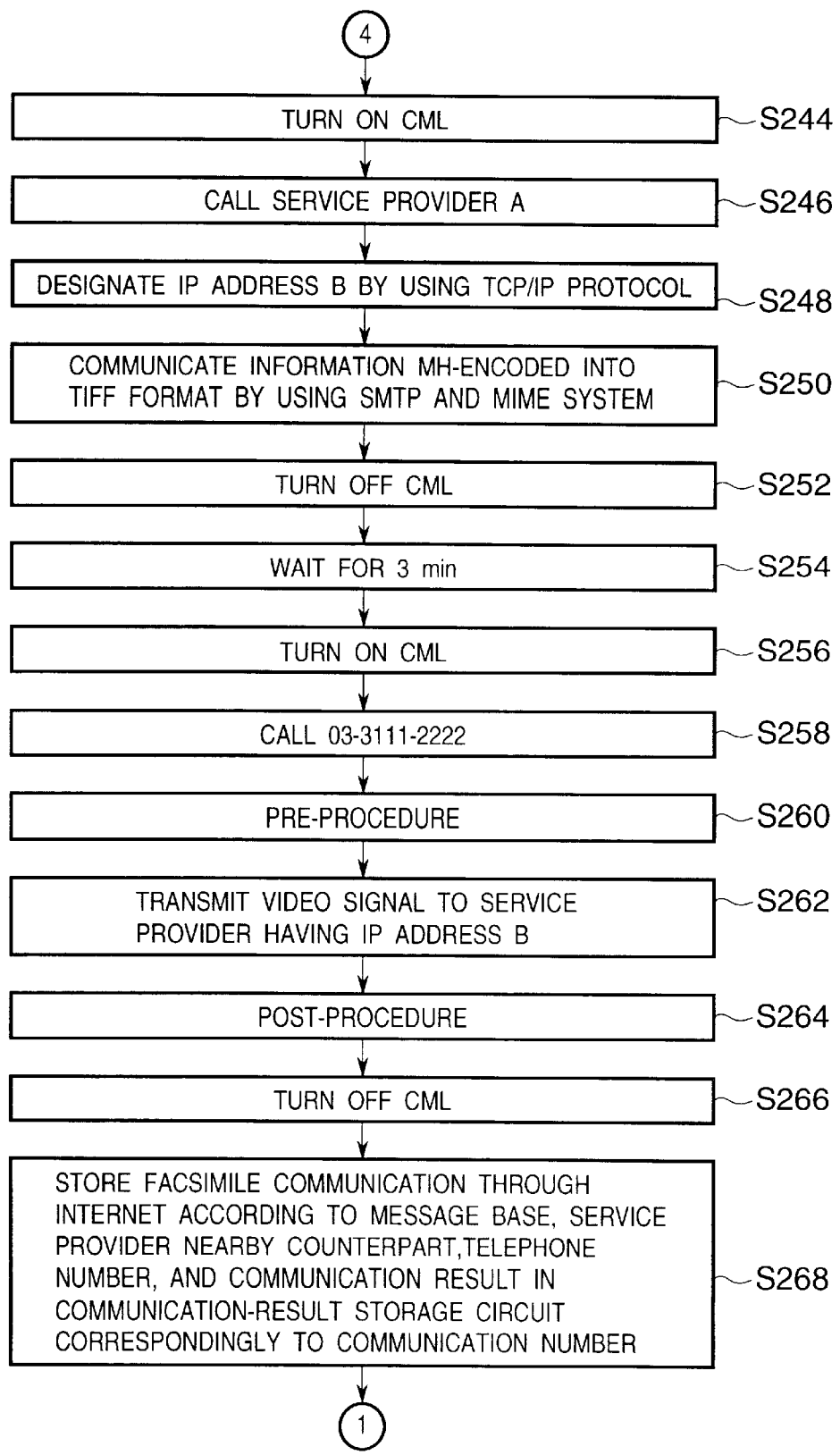
FIG. 15 is a flowchart showing the processings to be executed by the embodiment 4 of the present invention.

FIG. 11 is a drawing showing the system configuration having the facsimile system of the embodiment 4.

In FIG. 11, a facsimile system 2100 (FAX_A) is connected with a service provider A 240, a FAX service provider A 242, and a facsimile system 254 (FAX_E) through a PSTN (Public Switched Telephone Network) 256. A facsimile system 248 (FAX_B) is connected with a service provider B 244 through a PSTN 258. A facsimile system 250 (FAX_C) is connected with a service provider B 244 through a leased line 262. A facsimile system 252 (FAX_D) is connected with a FAX service provider B 246 through a PSTN 264. Moreover, the FAX_A 2100, FAX_B 248, FAX_C 250, FAX_D 252, and FAX_E 254 can be facsimile-communicated each other through the Internet 60.

The service provider A 240, service provider B 244, FAX service provider A 242, and FAX service provider B 246 are connected each other through the Internet 60. Reference numeral 2a denotes a telephone line.

Then, the configuration of the FAX_ 2100 will be described below in detail.

The FAX_B 248, FAX_C 250, FAX_D 252, and FAX_E 254 respectively have at least the configuration same as that of the FAX_A 2100.

As for the FAX_A 2100, reference numeral 22 denotes an NCU (Network Control Unit) which performs connection control to a terminal to be connected to the PSTN 256 in order to use the PSTN 256 for data communication or the like, switching to the data channel of the PSTN 256, or holding of a loop. Moreover, the NCU 22 connects a telephone line 22a to a telephone 24 when a signal level (signal line 220a) supplied from a control circuit 220 is set to "0," and connects the telephone line 22a to a facsimile system (hybrid circuit 26) when the signal level is set to "1." Moreover, the telephone line 22a is connected to the telephone 24 under the normal state.

Reference numeral 26 denotes a hybrid circuit, which separates a transmission-system signal from a reception-system signal and transmits a signal supplied from an addition circuit 212 to the telephone line 22a via the NCU 22. Moreover, the circuit 26 receives a signal from a counterpart via the NCU 22 and outputs the signal to a MODEM 228 via a signal line 26a. Reference numeral 28 denotes a MODEM which modulates and demodulates an input signal in accordance with the ITU-T recommendation V. 8, V. 21, V. 27ter, V. 29, V. 17, or V. 34, in which each transmission mode is designated by a signal line 220c. Moreover, the MODEM 228 inputs a signal from a signal line 220b and outputs modulated data to a signal line 228a. Furthermore, the MODEM 228 inputs a signal from the signal line 26a and outputs demodulated data to a signal line 28b. Furthermore, the MODEM 228 can transmit and receive a DTMF.

Reference numeral 210 denotes an ANSam transmission circuit for transmitting an ANSam signal, which transmits the ANSam signal to a signal line 210a when a signal at a signal level "1" is outputted to a signal line 220d. Moreover, when a signal at a signal level "0" is outputted to the signal line 220d, the circuit does not output any signal to the signal line 210a. Reference numeral 212 denotes an addition circuit which inputs a signal from the signal line 228a and a signal from the signal line 210a and outputs a signal obtained by adding the above signals to a signal line 12a.

Reference numeral 214 denotes a read circuit which outputs read data to a signal line 214a. Reference numeral 216 denotes a recording circuit, which successively records signals, supplied from a signal line 220e every line. Reference numeral 218 denotes a memory circuit which stores raw information or encoded information of read data, or stores received information or decoded information.

Reference numeral 222 denotes an operating section which is configured from one-touch dials, abbreviated dials, ten key, * key, # key, @ key, · key, set key, PSTN/Internet selection key, session base/message base/FAX service provider selection key, start key, communication control report output key, entry key for performing entry in an address information entry circuit 224, and other function keys, in which the key information made to correspond to a pressed key is outputted to a signal line 222a.

Reference numeral 224 denotes an address information entry circuit for entering address information correspondingly to a communication counterpart. For example, when one-touch dials 01 to 50 are present in the operating section 222, facsimile communication using only a PSTN or facsimile communication through the Internet is entered correspondingly to a communication counterpart and each one touch dial. Moreover, as for facsimile communication through the Internet, any one of the session base (the IP address of the terminal of a communication counterpart is also entered), the message base (the IP address of a service provider nearby a communication counterpart and the telephone number of the terminal of the communication counterpart through a PSTN are also entered), and the use of a FAX service provider (a unique address corresponding to a communication counterpart is also entered) is entered through a signal line 224a.

Reference numeral 226 denotes a display circuit which inputs and displays a signal supplied from a signal line 220f. Reference numeral 228 denotes a communication-result storage circuit, which stores the results of, for example, 40 recent communications correspondingly to a communication number issued for each communication through the signal line 228a. As the communication results, the display circuit 226 also stores not only success/fail in communication, communication time, number of communication pages, and communication counterpart but also the information showing whether facsimile communication using only a PSTN is executed or facsimile communication through the Internet is executed and the information showing a communication method selected out of those using the session base, message base, and FAX service provider in case of facsimile communication through the Internet.

Reference numeral 220 denotes a control circuit, which performs the following control. In a facsimile system capable of performing facsimile communication through the Internet, it is entered whether to execute facsimile communication using only a PSTN or facsimile communication through the Internet correspondingly to a communication counterpart. Moreover, in case of facsimile communication through the Internet, a communication method selected out of those using the session base, message base, and FAX service provider is entered. The IP address of the terminal of a communication counterpart is entered when the session base is selected, the IP address of a service provider nearby the communication counterpart and the telephone number of the terminal of the communication counterpart through a PSTN are entered when the message base is selected, and a unique address corresponding to the communication counterpart is entered when the FAX service provider is selected.

Moreover, when the call-out to the communication counterpart in which facsimile communication through the Internet according to the session base is entered is selected, entered IP addresses are communicated after dial-up connection is completed to execute communication by using the SMTP. Moreover, when the call-out to the communication counterpart in which facsimile communication through the Internet according to the message base is entered is selected, entered IP addresses are communicated after dial-up connection is completed to execute communication by using the SMTP. When a predetermined time elapses after the communication is completed, an entered PSTN telephone number is called to communicate the party, the number of communication pages, and the date (year, month, day, hour, and minute) for which facsimile communication through the Internet was executed to the currently entered IP address as facsimile information. Moreover, when the call-out to the communication counterpart in which facsimile communication through the Internet using a FAX service provider is entered is selected, a unique signal corresponding to the communication counterpart is transmitted in accordance with a DTMF signal after dial-up connection is completed and thereafter, facsimile communication based on ITU-T T. 30 is executed.

Moreover, at least the information showing whether facsimile communication using only a PSTN or facsimile communication through the Internet is performed and the information showing a communication method selected among those using the session base, message base, and FAX service provider is used for facsimile communication through the Internet are described in the communication result report for each communication output whenever the communication-control-report output key on the operating section 222 of the embodiment 4 is pressed or the communication result report for each predetermined communication.

Then, the processings to be executed by this embodiment (processings to be executed by the control circuit 220) will be described below by referring to FIGS. 12 to 17.

FIGS. 12 to 17 are flowcharts showing the processings to be executed by the embodiment 4 of the present invention.

In step S202, the information in the address-information entry circuit 224 is cleared through the signal line 224a. In step S204, the information in the communication-result storage circuit 228 is cleared through the signal line 228a. In step S206, 0001 is set as a communication number. In step S208, the display circuit 226 is prevented from displaying any data through the signal line 220f. In step S210, a signal at a signal level "0" is outputted to the signal line 220d to prevent an ANSam signal from being transmitted. In step S214, a signal supplied from the signal line 222a is inputted to decide whether entry in the address-information entry circuit 224 is selected. When the entry is not selected (NO in step S214), step S218 is started. However, when the entry is selected (YES in step S214), step S216 is started.

In step S216, address information is entered in the address-information entry circuit 224 through the signal line 224a correspondingly to a communication counterpart. For example, it is entered in the one-touch dial 01 that a communication counterpart uses FAX_E 254, facsimile communication using only a PSTN is performed, and the telephone number of the counterpart is 03-3123-4567. Moreover, it is entered in the one-touch dial 02 that a communication counterpart uses FAX_C 250, facsimile communication through the Internet is performed and its communication method uses the session base, and the communication counterpart has IP address A. Furthermore, it is entered in the one-touch dial 03 that a communication counterpart uses FAX_B 248, facsimile communication through the Internet is performed and its communication method uses the message base, a service provider nearby the communication counterpart has IP address B, and the telephone number of the communication counter part is 03-3111-2222. Furthermore, it is entered in the one-touch dial 04 that a communication counterpart uses FAX_D 252, facsimile communication through the Internet is performed and its communication method uses a FAX service provider and its unique address is 03.

In step S218, a signal supplied from the signal line 222a is inputted to decide whether call-out is selected. When call-out is not selected (NO in step S218), step S286 is started. However, when call-out is selected (YES in step S218), step S220 is started. In this case, decision on call-out is made in accordance with whether a one-touch dial is pressed.

In step S220, the call-out method is checked. As for the embodiment 4, when the one-touch dial 01 is pressed, facsimile communication using only a PSTN is performed and a communication counterpart uses FAX_E 254. In this case, step S222 is started. When the one-touch dial 02 is pressed, facsimile communication through the Internet according to the session base is performed and a communication counterpart uses FAX_C 250. In this case, step S234 is started. When the one-touch dial 03 is pressed, facsimile communication through the Internet according to the message base is performed and a communication counterpart uses FAX_B 248. In this case, step S244 is started. When the one-touch dial 04 is pressed, facsimile communication through the Internet using a FAX service provider is performed and a communication counterpart uses FAX_D 252. In this case, step S270 is started.

Processings to be executed in accordance with a checked call-out method are described below.

First, to perform facsimile communication using only a PSTN, in step S222, a signal at a signal level "1" is outputted to the signal line 220a to turn on a CML. In step S224, a telephone number corresponding to the one-touch dial 01 is called. In step S226, pre-procedure is executed. In step S228, a video signal is transmitted. In step S230, post-procedure is executed. In step S231, a signal at a signal level "0" is outputted to the signal line 220a to turn off the CML. In step S232, the fact that facsimile communication using only a PSTN is performed, the telephone number of a communication counterpart, and communication results are stored in a communication-result storage circuit 228 through the signal line 228a correspondingly to a communication number. After they are stored, the value of the communication number is incremented by 1.

However, to perform facsimile communication through the Internet according to the session base, a signal at a signal level "1" is outputted to the signal line 220a in step S234 to turn on the CML. In step S236, the service provider A 240 is called. In step S238, an IP address A is designated by using a TCP/IP in real time. In step S240, the information MH-encoded into the Tiff format is communicated by using the SMTP and the MIME system. In step S241, a signal at a signal level "0" is outputted to the signal line 220a to turn off the CML. Instep S242, the fact that facsimile communication through the Internet according to the session base is performed, the IP address of a communication counterpart, and communication results are stored in the communication-result storage circuit 228 correspondingly to a communication number through the signal line 228a. After they are stored, the value of the communication number is incremented by 1.

To perform facsimile communication through the Internet according to the message base, a signal at a signal level "1" is outputted to the signal line 220a in step S244 to turn on the CML. In step S246, the service provider A 240 is called. In step S248, the IP address B is designated by using the TCP/IP. In step S250, the information MH-encoded into the Tiff format is communicated by using the SMTP and the MIME system. In step S252, a signal at a signal level "0" is outputted to the signal line 220a to turn off the CML. In step S254, wait is performed for 3 min. In step S256, a signal at a signal level "1" is outputted to the signal line 220a to turn on the CML. In step S258, the telephone number 03-3111-2222 of a communication counterpart is called. In step S260, pre-procedure is executed. In step S262, a video signal is transmitted to the service provider of the IP address B. In step S264, post-procedure is executed. In step S266, a signal at a signal level "0" is outputted to the signal line 220a to turn off the CML. In step S268, the fact that facsimile communication according to the message base is performed, a service provider nearby a communication counterpart, telephone number, and communication results are stored in the communication-result storage circuit 228 correspondingly to a communication number through the signal line 228a. After they are stored, the value of the communication number is incremented by 1.

Moreover, to perform facsimile communication through the Internet using a FAX service provider, a signal at a signal level "1" is outputted to the signal line 220a in step S270 to turn on the CML. In step S272, the FAX service provider A 42 is called. In step S274, a unique address 03 entered in the one-touch dial 04 is transmitted in accordance with a DTMF signal. In step S276, pre-procedure is executed. In step S278, a video signal is transmitted. In step S280, post-procedure (according to ITU-T recommendation T. 30) is executed. In step S282, a signal at a signal level "0" is outputted to the signal line 220a to turn off the CML. In step S284, the fact that facsimile communication through the Internet using a FAX service provider is performed, the unique address of a communication counterpart, and communication results are stored in the communication-result storage circuit 228 correspondingly to a communication number through the signal line 228a. After they are stored, the value of the communication number is incremented by 1.

However, when call-out is not selected in step S218 (NO in step S218), a signal is inputted from the signal line 222a in step S286 to decide whether the output of the communication result report is selected. When the output is not selected (NO in step S286), step S296 is started to perform other processings and step S210 is restarted. However, when the output is selected (YES in step S286), step S288 is started.

In step S288, it is decided whether the output of the communication result report is made of one communication. When the output is made of one communication (YES in step S288), step S292 is started to set 1 to a counter n and step S294 is started. However, when the output is not made of one communication (NO in step S288), step S290 is started to set 40 to the counter n and step S294 is started.

In step S294, communication results including the information showing that facsimile communication using only a PSTN or facsimile communication through the Internet is performed by relating communication results report of the latest n communication corresponding to the number of values set to the counter n to the communication number, the information showing which is used among the session base, message base, and FAX service provider when facsimile communication through the Internet is performed, and the information for communication counterparts entered in the address-information entry circuit 224 are outputted to the recording circuit 16. Thereafter, step S210 is restarted.

Then, the entry processing through one-touch dials will be described below by referring to FIGS. 18 and 19.

Figure 18:
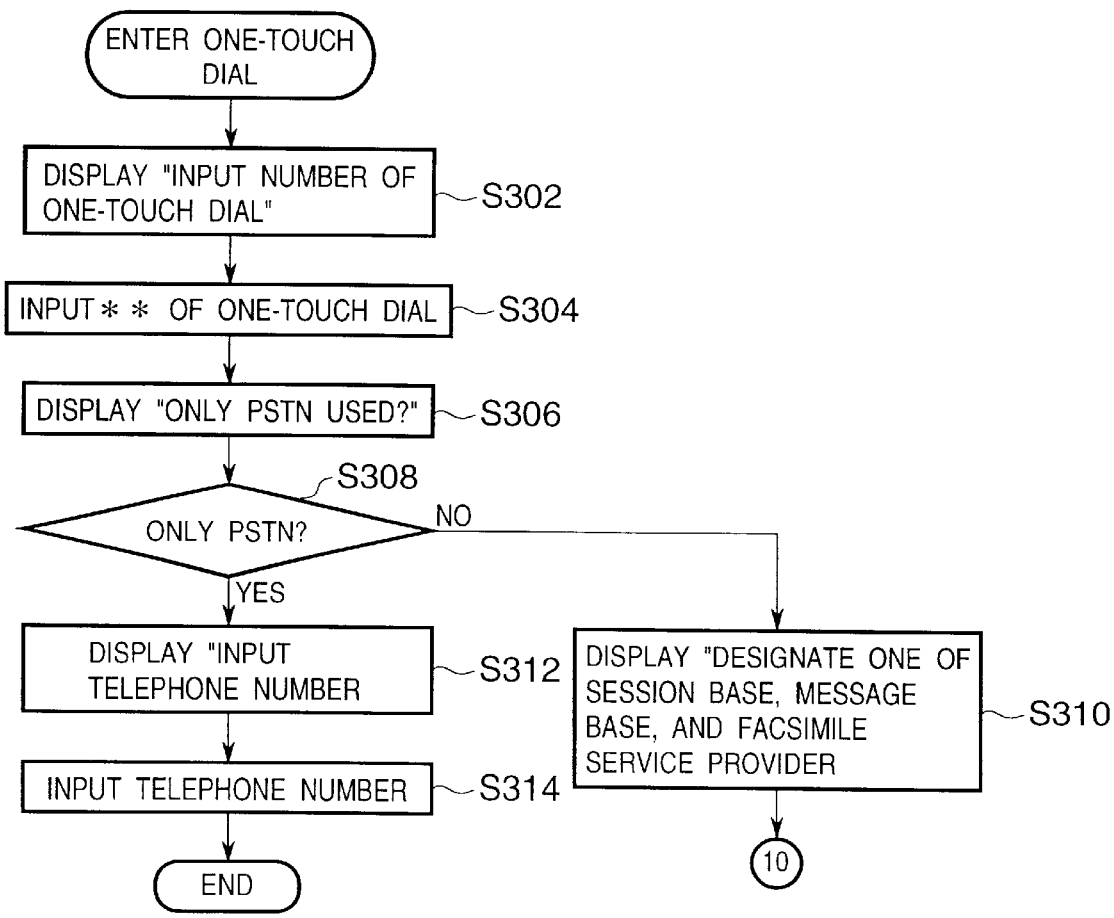
FIG. 18 is a flowchart showing the one-touch-dial entry processing of the embodiment 4 of the present invention.
Figure 19:
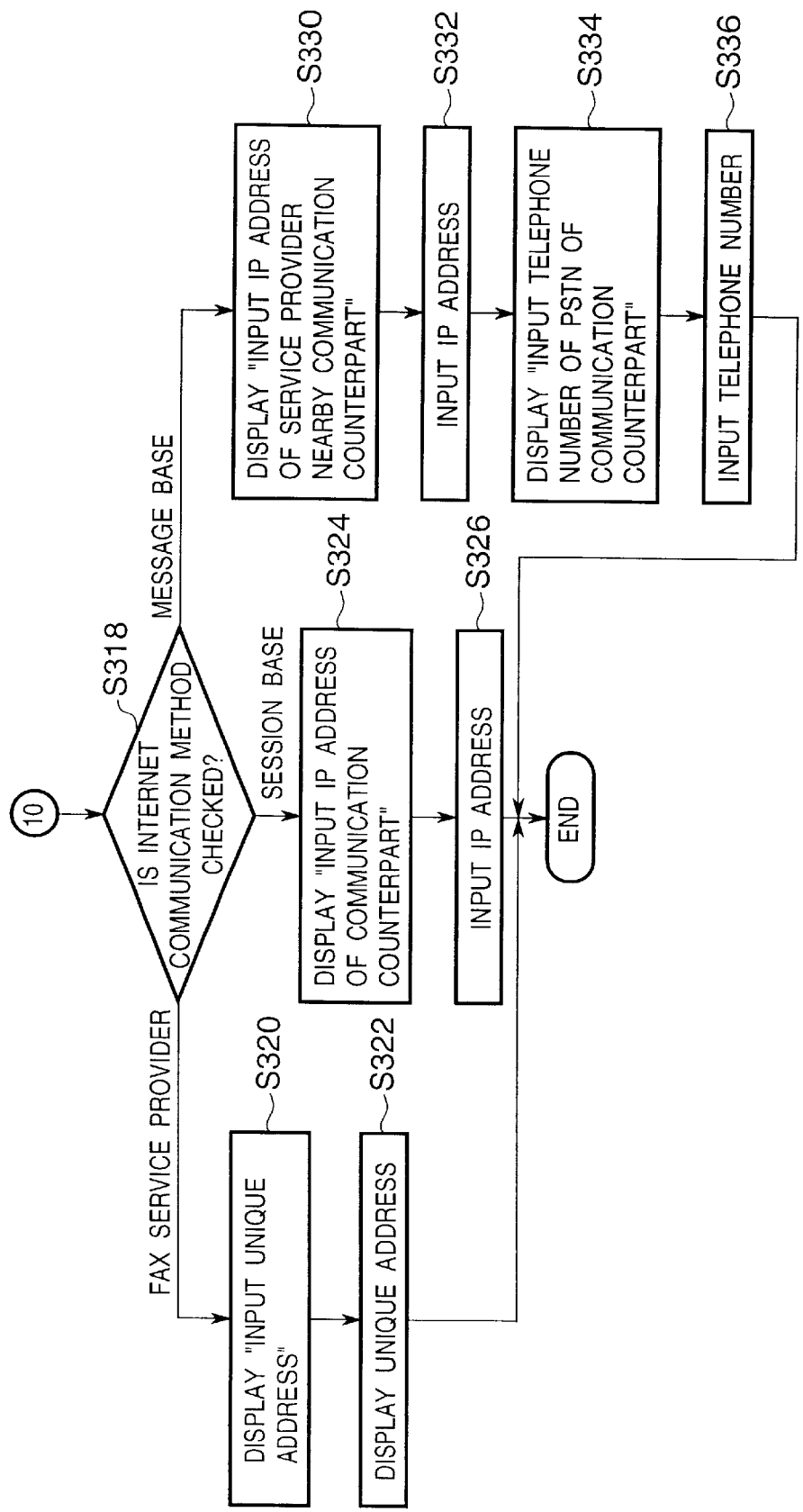
FIG. 19 is a flowchart showing the one-touch-dial entry processing of the embodiment 4 of the present invention.

FIGS. 18 and 19 are flowcharts showing the one-touch-dial entry processing of the embodiment 4 of the present invention.

In step S302, a message "Input the number of a one-touch dial." is displayed on the display circuit 226 through the signal line 220f. In step S304, a desired one-touch dial  is inputted through the signal line 222a.In step S306, a message "Does the communication counterpart use only a PSTN?" is displayed on the display circuit 226 through the signal line 220f. In step S308, a signal supplied from the signal line 222a is inputted to decide whether only a PSTN is used. When only the PSTN is used (YES in step S308), step S312 is started to display a message "Input a telephone number." on the display circuit 226. Then, in step S314, a signal supplied from the signal line 222a is inputted to input the telephone number of a communication counterpart and complete the processing. However, when only the PSTN is not used (NO in step S308), step S310 is started to display a message "Which does the communication counterpart use, session base, message base, or FAX service provider?" on the display circuit 226**.

In step S318, a signal supplied from the signal line 222a is inputted to check the communication method of facsimile communication through the Internet. When the communication method uses FAX service provider, step S220 is started to display a message "Input the unique address of the communication counterpart." on the display circuit 226. Then, in step S322, a signal supplied from the signal line 222a is inputted to input the unique address and complete the processing.

When the communication method uses the session base, step S324 is started to display a message "Input the IP address of the communication counterpart." on the display circuit 226. Then, in step S326, a signal supplied from the signal line 222a is inputted to input the IP address and complete the processing.

When the communication method uses the message base, step S330 is started to display a message "Input the IP address of a service provider nearby the communication counterpart." on the display circuit 226. Then, in step S332, a signal supplied from the signal line 222a is inputted to input the IP address. Then, in step S334, a message "Input the telephone number of the PSTN of the communication counterpart." is displayed on the display circuit 226. In step S336, a signal supplied from the signal line 222a is inputted to input the telephone number and complete the processing.

As described above, the embodiment 4 makes it possible to properly select one of the communication methods for facsimile communication through the Internet including the communication using the session base (for example, to be executed for an address allowing real-time communication), the communication using the message base (for example, to be executed when a communication counterpart is a personal computer), and the communication using a FAX service provider (for example, to be used when the function of the FAX service provider can be effectively used) in accordance with the taste of a user correspondingly to a communication counterpart. Moreover, it is possible to enter the information for a communication counterpart in accordance with each communication method and guidance. Therefore, a user can more efficiently execute the operation for performing facsimile communication through the Internet.

Moreover, by considering the communication results, a user can also change entered communication methods through the Internet correspondingly to a communication counterpart. Furthermore, as for facsimile communication through the Internet in which an address is designated through a ten-key pad, a user can select one of the three communication methods and input the information for a communication counterpart in accordance with guidance. Thus, the operability is simplified and the manipulability is improved.

Embodiment 5

The embodiment 4 is configured so as to set facsimile communication using only a PSTN or facsimile communication through the Internet and then, designate any one of the session base, message base, and FAX service provider as the communication method for facsimile communication through the Internet. However, it is also possible to use a configuration for changing the information to be inputted later in accordance with the above designation.

Processings to be executed in the above case will be described below by referring to FIG. 20.

Because the processings described below are almost the same as those described for the embodiment 4, only different processings will be described.

Figure 20:
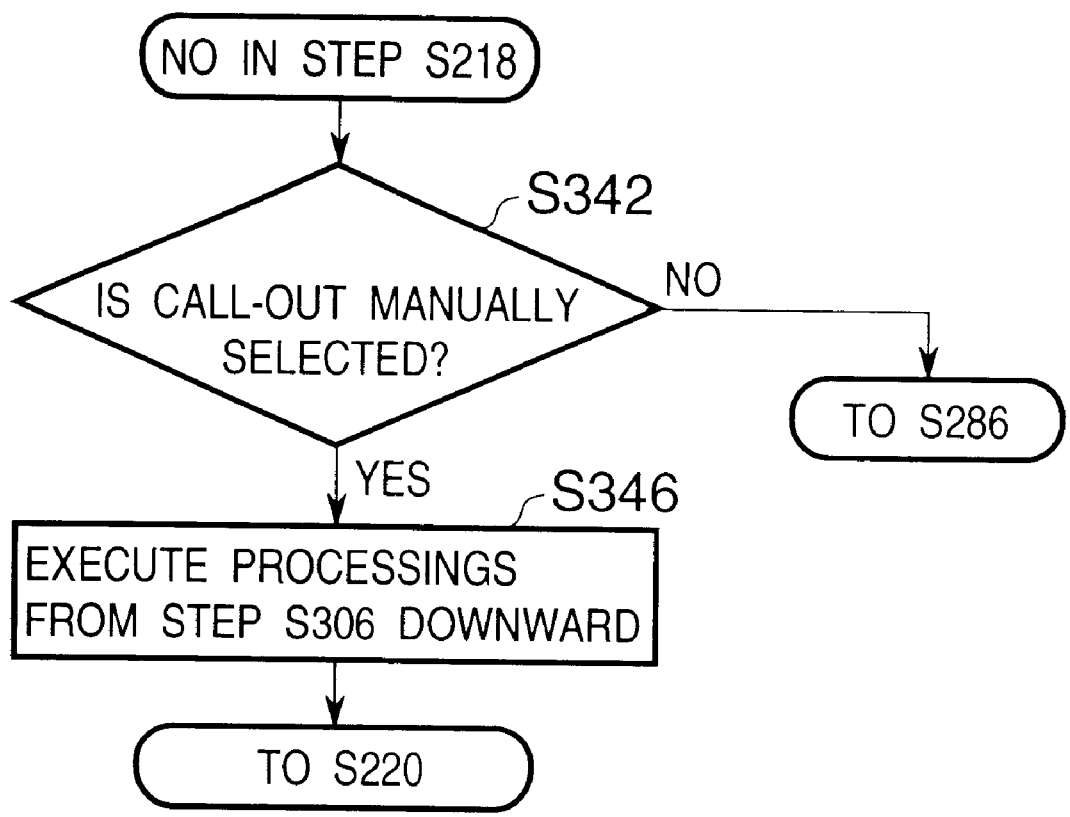
FIG. 20 is a flowchart showing the processings to be executed by an embodiment 5 of the present invention.

FIG. 20 is a flowchart showing the processings to be executed by the embodiment 5.

In step S342, a signal supplied from a signal line 222a is inputted to decide whether manual call-out is selected. When manual call-out is selected (YES in step S342), step S346 is started to execute the processings in and after step S306 shown by the embodiment 4 shown in FIGS. 18 and 19. Thereafter, step S220 is started. However, when manual call-out is not selected (NO in step S342), step S286 is started.

As described above, the embodiment 5 makes it possible to further increase the number of options for operations for facsimile communication in addition to the advantages described for the embodiment 4. Thereby, a user can manually call a communication counterpart.

The present invention can be also applied to a system configured from a plurality of units (e.g. host computer, interface units, reader, or printer) or an apparatus constituted of one unit (e.g. copying machine or facsimile system).

Moreover, it is needless to say that the object of the present invention can be attained when a storage medium in which program codes of the software for realizing the functions of the above embodiments are stored is supplied to a system or apparatus and the computer (or CPU or MPU) of the system or apparatus reads and executes the program codes stored in the storage medium.

In this case, the program codes read out of the storage medium realize the functions of embodiments and the storage medium in which the program codes are stored constitutes the present invention.

As a storage medium for supplying program codes, it is possible to use a floppy disk, hard disk, optical disk, photomagnetic disk, CD-ROM, CD-R, magnetic tape, nonvolatile memory card, or ROM.

Moreover, by executing program codes read by the computer, it is needless to say that not only the functions of the above embodiments are realized but also the cases are included in which an OS (operating system) operating on the computer performs some or all of actual processings in accordance with instructions by the program codes and the functions of the above embodiments are realized through the processings.

Furthermore, it is needless to say that a case is included in which program codes read out of a storage medium are written in a memory provided for a function extending board inserted into a computer or a function extending unit connected to the computer, then the CPU provided for the function extending board or function extending unit executes some or all of actual processings in accordance with instructions by the program codes, and functions of the above embodiments are realized through the processings.

What is claimed is:

1. A communication system for performing facsimile communication through the Internet, comprising:

decision means for deciding the connection mode of a call-in-party terminal; and control means for controlling the facsimile communication with the call-in party in accordance with a decision result by the decision means, wherein the control means executes facsimile communication with the call-in-party terminal in accordance with the message base when the connection mode of the call-in-party terminal uses dial-up connection as a result of the decision by the decision means.

2. A communication system for performing facsimile communication through the Internet, comprising:
   decision means for deciding the connection mode of a call-in-party terminal; and
   control means for controlling the facsimile communication with the call-in party in accordance with a decision result by the decision means,
   wherein facsimile communication with the call-in-party terminal is executed in accordance with the session base when the connection mode of the call-in-party terminal uses leased-line connection as a result of the decision by the decision means.

3. The communication system according to claim 1, wherein the decision means is provided with the IP address or telephone number of the call-in-party terminal and management means for managing the connection mode of the call-in-party terminal to decide the connection mode of a call-in-party terminal serving as an object of the facsimile communication by referring to the management means.

4. The communication system according to claim 3, further comprising entry means for entering the IP address or telephone number of the call-in-party terminal and the connection mode of the call-in-party terminal in the control means.

5. The communication-system control method for performing facsimile communication through the Internet, comprising:
   a decision step, of deciding the connection mode of a call-in-party terminal; and
   a control step, of controlling the facsimile communication with the call-in-party in accordance with a decision result made in the decision step,
   wherein the control step includes executing facsimile communication with the call-in-party terminal in accordance with the message base when the connection mode of the call-in-party terminal uses dial-up connection as a result of the decision made in the decision step.

6. A communication-system control method for performing facsimile communication through the Internet, comprising:
   a decision step, of deciding the connection mode of a call-in-party terminal; and
   a control step, of controlling the facsimile communication with the call-in party in accordance with a decision result made in the decision step,
   wherein facsimile communication is executed with the call-in-party terminal in accordance with the session base when the connection mode of the call-in-party terminal uses leased-line connection as a result of the decision by the decision step.

7. The communication-system control method according to claim 5, wherein the decision step includes a management step, of managing the IP address or telephone number of the call-in-party terminal and the connection mode of the call-in-party terminal by storing them in a storage medium to decide the connection mode of a call-in-party terminal serving as an object of the facsimile communication by performing the management step.

8. The communication-system control method according to claim 7, further comprising an entry step, of entering the IP address or telephone number of the call-in-party terminal and the connection mode of the call-in-party terminal in the storage medium.

9. A communication system capable of performing facsimile communication through the Internet, comprising:
   management means for managing at least a communication counterpart, information showing whether the communication to the communication counterpart uses facsimile communication using only a PSTN or facsimile communication through the Internet, and communication information showing any one of the session base, message base, and FAX service provider used by the facsimile communication through the Internet as its communication method; and
   control means for controlling the communication to the communication counterpart by referring to the communication information managed by the management means,
   wherein the management means further manages a unique address corresponding to the communication counterpart when the communication to the communication counterpart uses facsimile communication through the Internet using a FAX service provider.

10. The communication system according to claim 9, wherein the management means further manages the IP address of the communication counterpart when the communication to the communication counterpart uses facsimile communication through the Internet according to the session base.

11. The communication system according to claim 9, wherein the management means further manages the IP address of a service provider nearby the communication counterpart and the telephone number of the communication counterpart through an PSTN when the communication to the communication counterpart uses facsimile communication through the Internet according to the message base.

12. The communication system according to claim 9, wherein the control means communicates an IP address corresponding to a communication counterpart in which the facsimile communication through the Internet according to the session base is managed to the communication counterpart after dial-up connection is completed and executes communication by using the SMTP, when call-out to the communication counterpart is selected.

13. The communication system according to claim 9, wherein the control means communicates an IP address corresponding to a communication counterpart in which facsimile communication through the Internet according to the message base is managed to the counterpart after dial-up connection is completed, executes communication using the SMTP, calls a telephone number through a PSTN corresponding to the communication counterpart when a predetermined time elapses after the communication is completed, and communicates the contents of the facsimile communication through the Internet to the IP address, when call-out to the communication counterpart is selected.

14. The communication system according to claim 9, wherein the control means transmits a unique address corresponding to a communication counterpart in which facsimile communication through the Internet using a FAX service provider is managed in accordance with a DTMF signal after dial-up connection is completed and thereafter, executes facsimile communication based on ITU-T T. 30, when callout to the communication counterpart is selected.

15. The communication system according to claim 9, wherein the management means further manages a communication result for each communication and is further provided with output means for outputting the communication result, and
   the communication result includes at least the information showing whether facsimile communication using only a PSTN is used or facsimile communication through the Internet is used and the information showing any one of the session base, message base, and FAX service provider when facsimile communication through the Internet is used as a communication method.

16. The communication system according to claim 9, further comprising entry means for entering the communication information for a new communication counterpart in the management means.

17. A communication-system control method capable of performing facsimile communication through the Internet, comprising:
   a management step, of managing a communication counterpart, information showing whether the communication to the communication counterpart is facsimile communication using only a PST or facsimile communication through the Internet, and information showing whether the communication method for the facsimile communication through the Internet if used uses the session base, message base, or FAX service provider through at least a storage medium; and
   a control step, of controlling the communication to the communication counterpart by referring to the communication information managed by the storage medium in the management step,
   wherein the management control step further includes managing a unique address corresponding to a communication counterpart by storing it in the storage medium when the communication to the communication counterpart uses facsimile communication through the Internet using a FAX service provider.

18. The communication-system control method according to claim 17, wherein the management step further includes managing the IP address of the communication counterpart by storing it in the storage medium when the communication to the communication counterpart uses facsimile communication through the Internet according to the session base.

19. The communication-system control method according to claim 17, wherein the management step further includes managing the IP address of a service provider nearby a communication counterpart and the telephone number of the communication counterpart through a PSTN by storing them in the storage medium when the communication to the communication counterpart uses facsimile communication through the Internet according to the message base.

20. The communication-system control method according to claim 17, wherein the control step includes communicating an IP address corresponding to a communication counterpart in which the facsimile communication through the Internet according to the session base is managed to the communication counterpart after dial-up connection is completed and executes communication by using the SMTP, when call-out to the communication counterpart is selected.

21. The communication-system control method according to claim 17, wherein the control step includes communicating an IP address corresponding to a communication counterpart in which facsimile communication through the Internet according to the message base is managed to the counterpart after dial-up connection is completed, executes communication using the SMTP, calling a telephone number through a PSTN corresponding to the communication counterpart when a predetermined time elapses after the communication is completed, and communicating the contents of the facsimile communication through the Internet to the IP address, when call-out to the communication counterpart is selected.

22. The communication-system control method according to claim 17, wherein the control step includes transmitting a unique address corresponding to a communication counterpart in which facsimile communication through the Internet using a FAX service provider is managed in accordance with a DTMF signal after dial-up connection is completed, and then executing facsimile communication based on ITU-T T. 30, when callout to the communication counterpart is selected.

23. The communication-system control method according to claim 17, wherein the management step further includes managing a communication result for each communication by storing it in the storage medium, and said method further comprising an output step, of for outputting the communication result; and
   wherein the communication result includes at least the information showing whether facsimile communication using only a PSTN is used or facsimile communication through the Internet is used and the information showing any one of the session base, message base, and FAX service provider when the facsimile communication through the Internet is used as a communication method.

24. The communication-system control method according to claim 17, further comprising an entry step, of entering the communication information of a new communication counterpart in a storage medium managed in the management step.

25. A computer-readable memory, storing codes for causing performance of a communication method capable of performing facsimile communication through the Internet, comprising:
   deciding the connection mode of a call-in-party terminal; and
   controlling the facsimile communication with the call-in party in accordance with a decision result from the decision step,
   wherein the controlling step includes executing facsimile communication with the call-in-party terminal in accordance with the message base when the connection mode of the call-in-party terminal uses dial-up connection as a result of the decision made in the decision step.

26. A computer-readable memory, storing codes for causing performance of a communication method capable of performing facsimile communication through the Internet, comprising:
   deciding the connection mode of a call-in-party terminal; and
   controlling the facsimile communication with the call-in party in accordance with a decision result made in the decision step,
   wherein facsimile communication with the call-in-party terminal is executed in accordance with the session base when the connection mode of the call-in-party terminal uses leased-line connection as a result of the decision made in the decision step.

27. A computer-readable memory, storing codes for causing performance of a communication method capable of performing facsimile communication through the Internet, comprising:
   managing at least a communication counterpart information showing whether the communication to the communication counterpart uses facsimile communication using only a PSTN or facsimile communication through the Internet, and communication information showing any one of the session base, message base, and FAX service provider used by the facsimile communication through the Internet as its communication method; and controlling the communication to the communication counterpart by referring to the communication information managed in the management step, wherein the management step further includes managing a unique address corresponding to the communication counterpart when the communication to the communication counterpart uses facsimile communication through the Internet using a FAX service provider.

* * * * *

UNITED STATES PATENT AND TRADEMARK OFFICE
CERTIFICATE OF CORRECTION

PATENT NO. : 6,714,315 B1
DATED : March 30, 2004
INVENTOR(S) : Takehiro Yoshida

Figure 16:
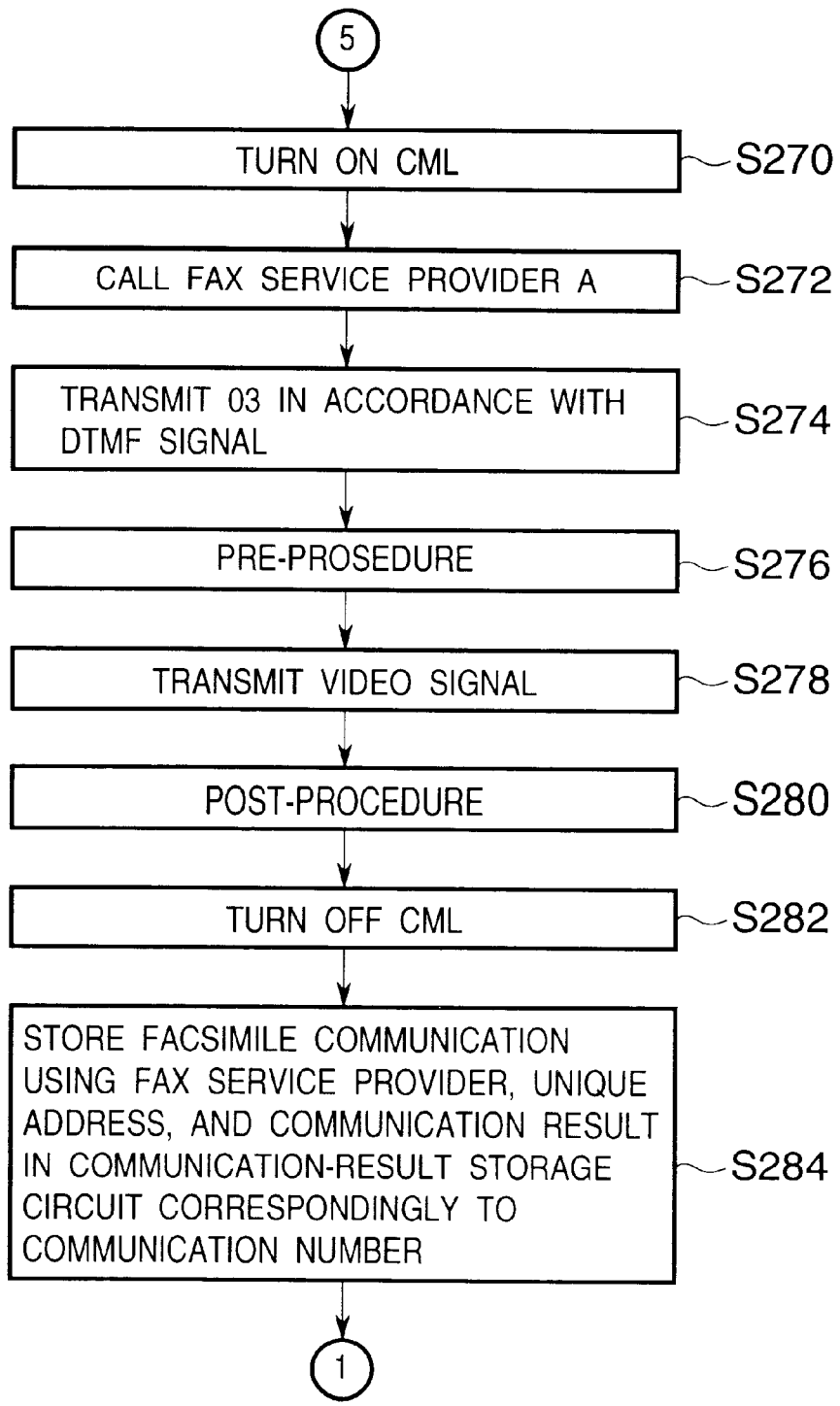
FIG. 16 is a flowchart showing the processings to be executed by the embodiment 4 of the present invention.
Figure 17:
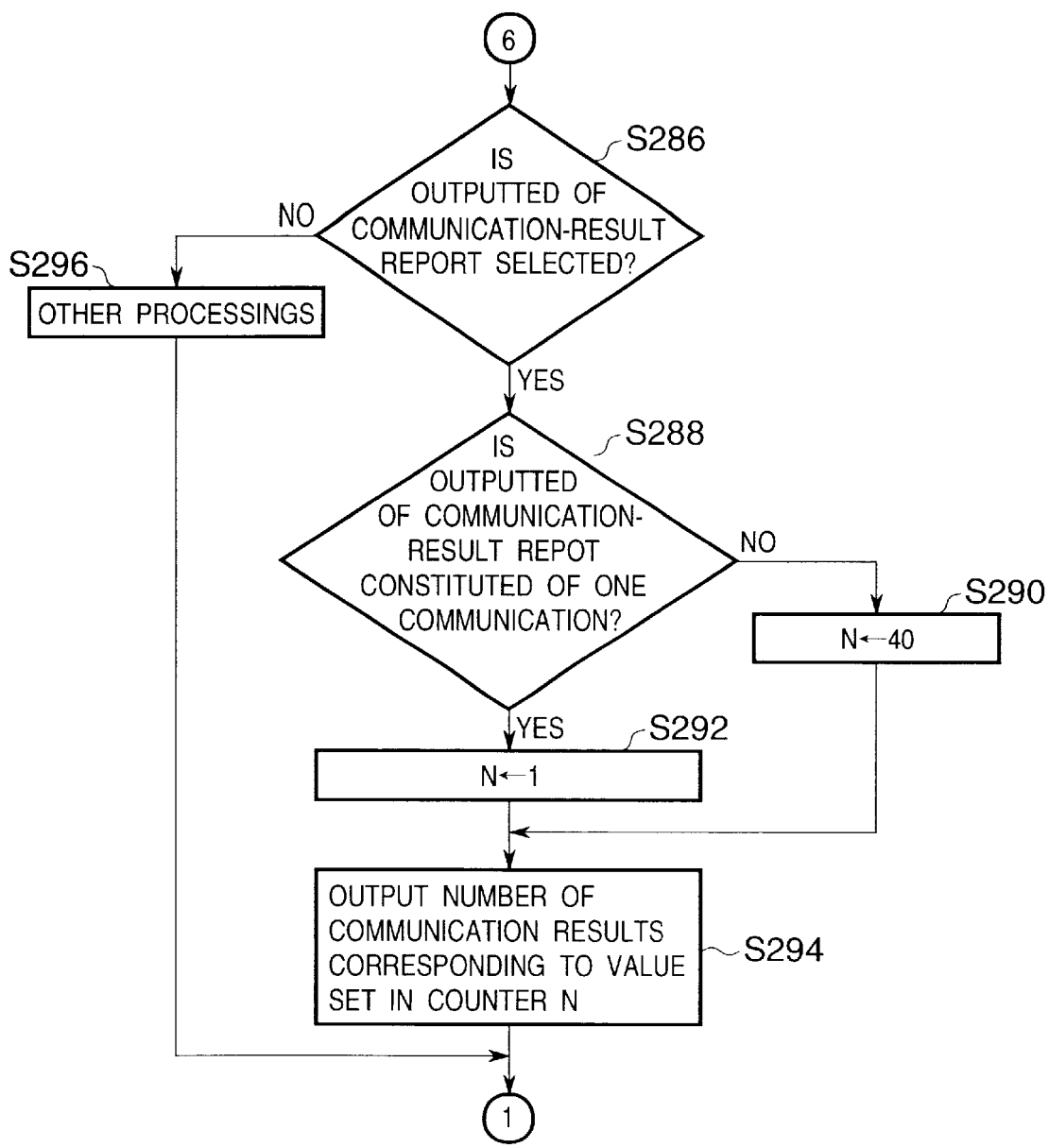
FIG. 17 is a flowchart showing the processings to be executed by the embodiment 4 of the present invention.

It is certified that error appears in the above-identified patent and that said Letters Patent is hereby corrected as shown below:

Drawings,
Sheet 15, Fig. 16, "PRE-PROSEDURE" should read -- PRE-PROCEDURE --.
Sheet 16, Fig. 17, "REPOT" should read -- REPORT --.

Column 2,
Line 20, "That is:" should read -- That is; --.

Column 4,
Line 61, "connected" should read -- connected to --.

Column 6,
Line 20, "instep S2," should read -- in step S2, --.

Column 7,
Line 32, "the." should read -- the --.

Column 9,
Line 55, "to an" should read -- to a --.

Column 10,
Line 23, "turnoff" should read -- turn off --.
Line 61, "Instep" should read -- In step --.

Column 11,
Lines 11 and 19, "according" should read -- according to --.
Lines 63 and 66, "each" should read -- to each --.

Column 14,
Line 50, "counter part" should read -- counterpart --.

Column 19,
Line 28, "5. The" should read -- 5. A --.

Column 20,
Line 30, "an PSTN" should read -- a PSTN --.

UNITED STATES PATENT AND TRADEMARK OFFICE
CERTIFICATE OF CORRECTION

PATENT NO. : 6,714,315 B1
DATED : March 30, 2004
INVENTOR(S) : Takehiro Yoshida

It is certified that error appears in the above-identified patent and that said Letters Patent is hereby corrected as shown below:

Column 21,
Line 15, "a PST" should read -- a PSTN --.

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,714,315 B1
DATED : March 30, 2004
INVENTOR(S) : Takehiro Yoshida

It is certified that error appears in the above-identified patent and that said Letters Patent is hereby corrected as shown below:

Drawings,
Sheet 15, Fig. 16, "PRE-PROSEDURE" should read -- PRE-PROCEDURE --.
Sheet 16, Fig. 17, "REPOT" should read -- REPORT --.

Column 2,
Line 20, "That is:" should read -- That is; --.

Column 4,
Line 61, "connected" should read -- connected to --.

Column 6,
Line 20, "instep S2," should read -- in step S2, --.

Column 7,
Line 32, "the." should read -- the --.

Column 9,
Line 55, "to an" should read -- to a --.

Column 10,
Line 23, "turnoff" should read -- turn off --.
Line 61, "Instep" should read -- In step --.

Column 11,
Lines 11 and 19, "according" should read -- according to --.
Lines 63 and 66, "each" should read -- to each --.

Column 14,
Line 50, "counter part" should read -- counterpart --.

Column 19,
Line 28, "5. The" should read -- 5. A --.

Column 20,
Line 30, "an PSTN" should read -- a PSTN --.

UNITED STATES PATENT AND TRADEMARK OFFICE
CERTIFICATE OF CORRECTION

PATENT NO. : 6,714,315 B1
DATED : March 30, 2004
INVENTOR(S) : Takehiro Yoshida

It is certified that error appears in the above-identified patent and that said Letters Patent is hereby corrected as shown below:

Column 21,
Line 15, "a PST" should read -- a PSTN --.

Signed and Sealed this

Seventh Day of December, 2004

JON W. DUDAS
*Director of the United States Patent and Trademark Office*